US007930504B2

(12) United States Patent
Arimilli et al.

(10) Patent No.: US 7,930,504 B2
(45) Date of Patent: *Apr. 19, 2011

(54) HANDLING OF ADDRESS CONFLICTS DURING ASYNCHRONOUS MEMORY MOVE OPERATIONS

(75) Inventors: Ravi K. Arimilli, Austin, TX (US); Robert S. Blackmore, Poughkeepsie, NY (US); Chulho Kim, Poughkeepsie, NY (US); Balaram Sinharoy, Poughkeepsie, NY (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 699 days.

This patent is subject to a terminal disclaimer.

(21) Appl. No.: 12/024,575

(22) Filed: Feb. 1, 2008

(65) Prior Publication Data

US 2009/0198938 A1 Aug. 6, 2009

(51) Int. Cl.
*G06F 12/00* (2006.01)
*G06F 13/00* (2006.01)
*G06F 13/28* (2006.01)

(52) U.S. Cl. .. 711/165; 711/150; 711/152; 711/E12.002
(58) Field of Classification Search .................. None
See application file for complete search history.

(56) References Cited

U.S. PATENT DOCUMENTS

| 5,706,432 | A | 1/1998 | Elko et al. |
| 5,781,753 | A | 7/1998 | McFarland et al. |
| 6,212,628 | B1 | 4/2001 | Abercrombie et al. |
| 6,609,189 | B1 | 8/2003 | Kuszmaul et al. |
| 7,024,429 | B2 * | 4/2006 | Ngo et al. .......... 711/165 |
| 2005/0278492 | A1 * | 12/2005 | Stakutis et al. ......... 711/161 |

OTHER PUBLICATIONS

Zhao et al., "Hardware support for bulk data movement in server platforms", Proceedings of the 2005 International Conference on Computer Design (ICCD'05), Oct. 2-5 2005, IEEE, pp. 1-8.*
Deschler et al., B+ Retake: Sustaining High Volume Inserts into Large Data Pages, Proceedings of the 4th ACM International Workshop on Data Warehousing and OLAP, Nov. 9, 2001, p. 56-63, ACM, Atlanta, Georgia, USA.
Jayanti et al., Fault-Tolerant Wait-Free Shared Objects, Journal of ACM, May 1998, p. 451-500, vol. 45, No. 3, ACM, New York, NY, USA.

* cited by examiner

*Primary Examiner* — Matt Kim
*Assistant Examiner* — Ralph A Verderamo, III
(74) *Attorney, Agent, or Firm* — Dillon & Yudell LLP

(57) ABSTRACT

A method within a data processing system in which a processor handles conflicts, which occur during performance by an asynchronous memory mover of an asynchronous memory move (AMM) operation. The asynchronous memory mover performs an asynchronous memory move (AMM) operation by which the actual data is moved from a source to a destination memory location, independent of the processor. The memory mover sets a flag bit to indicate that the asynchronous memory mover is currently performing an AMM operation at the memory. When the processor receives a memory access operation, the processor checks the value of the flag bit before issuing the new memory access operation, and checks the associated address of the AMM operation to determine possible address conflicts. The processor then evaluates and responds to address conflicts to prevent corruption of data during an AMM operation.

16 Claims, 15 Drawing Sheets

ASYNCHRONOUS MEMORY MOVE (AMM) TERMINATE ST INSTRUCTION
420

| TID 415 | EA_SRC (SRC) 405 | EA_DST (DST, NID) 407 | CNT (NO. BYTES) 409 | AMM TERMINATE OPERANDS 421 | ⋮ |

*Fig. 4B*

ASYNCHRONOUS MEMORY MOVE (AMM) TERMINATE ST INSTRUCTION
430

| TID 415 | EA_SRC (SRC) 405 | EA_DST (DST, NID) 407 | AMM TERMINATE OPERANDS 421 | ⋮ |

*Fig. 4C*

ASYNCHRONOUS MEMORY MOVE (AMM) SYNC INSTRUCTION 440

| TID 415 | EA$_{SRC}$ (SRC) 405 | EA$_{DST}$ (DST, NID) 407 | CNT (NO. BYTES) 409 | SYNC 431 | OTHER CONTROL INFO 411 | ... |

*Fig. 4D*

ASYNCHRONOUS MEMORY MOVE (AMM) SYNC INSTRUCTION 450

| CNTL BITS 432 | AMM SYNC 431 | ... |

*Fig. 4E*

HANDLING OF ADDRESS CONFLICTS DURING ASYNCHRONOUS MEMORY MOVE OPERATIONS

GOVERNMENT RIGHTS

This invention was made with United States Government support under Agreement No. HR0011-07-9-0002 awarded by DARPA. The Government has certain rights in the invention.

CROSS REFERENCE TO RELATED APPLICATIONS

The present application is related to the following co-pending U.S. patent applications, filed on even date herewith and incorporated herein by reference in their entirety:
- Ser. No. 12/024,494, entitled "Method and System for Performing an Asynchronous Memory Move (AMM) Via Execution Of AMM Store Instruction Within Instruction Set Architecture;
- Ser. No. 12/024,486, entitled "Asynchronous Memory Move Across Physical Nodes (Dual-Sided Communication for Memory Move);"
- Ser. No. 12/024,504, entitled "Reporting of Partially Performed Memory Move;"
- Ser. No. 12/024,513, entitled "Completion of Asynchronous Memory Move in the Presence of a Barrier Operation;"
- Ser. No. 12/024,526, entitled "Cache Management During Asynchronous Memory Move Operations;"
- Ser. No. 12/024,546, entitled "Termination of In-Flight Asynchronous Memory Move;"
- Ser. No. 12/024,560, entitled "Mechanisms for Communicating with an Asynchronous Memory Mover to Perform AMM Operations;"
- Ser. No. 12/024,690, entitled "Launching Multiple Concurrent Memory Moves Via a Fully Asynchronous Memory Mover;"
- Ser. No. 12/024,674, entitled "Specialized Memory Move Barrier Operations;"
- Ser. No. 12/024,613, entitled "Fully Asynchronous Memory Mover;" and
- Ser. No. 12/024,598, entitled "Method for Enabling Direct Prefetching of Data During Asynchronous Memory Operation;"

BACKGROUND OF THE INVENTION

1. Technical Field

The present invention relates generally to data processing systems and in particular to data operations within data processing systems. Still more particularly, the present invention relates to operations that move memory data during processing on a data processing system.

2. Description of the Related Art

Standard operation of data processing systems requires access to and movement and/or manipulation of data by the processing components. Application data are typically stored in memory and are read/retrieved, manipulated, and stored/written from one memory location to another. Also, the processor may also perform a simple move (relocation) of data using a series of load and store commands issued by the processor when executing the application code.

With conventional data move operations, the processor transfers data from one memory location having a first physical (real) address to another location with a different physical (real) address. Completing the data move operation typically involves a number of steps, including: (1) the processor issues a particular sequence of load and store instructions, which result: (a) a TLB performs an address translation to translate the effective addresses of the processor issued operation into corresponding real address associated with the real/physical memory: and (b) a memory or cache controller performing a cache line read or memory read of the data; (2) the TLB passes the real address of the processor store instruction to the memory controller (via a switch/interconnect when the controller is off-chip); (3) the memory controller acquires a lock on the destination memory location (identified with a real address); (4) the memory controller assigns the lock to the processor; (5) the processor receives the data from the source memory location (identified with a real address); (6) the processor sends the data to the memory controller; (7) the memory controller writes the data to the destination location; (8) the memory controller releases the lock on the destination memory location; and (9) a SYNC completes on the system fabric to inform the processor that the data move has finally completed.

Inherent in the above process are several built-in latencies, which forces the processor to wait until the end of most of the above processes before the processor may resume processing subsequently received instructions. Examples of these built in latencies include: (a) the TLB having to convert the effective address (EA) of the operation to the corresponding real address via the TLB or ERAT to determine which physical memory location that EA is pinned to; (b) the memory controller retrieving the data from the source memory location, directing the sourced data to the processor chip and then forwarding the data from the processor chip to the destination memory location; and (c) and lock acquisition process.

The lock acquisition process and issuance of the SYNC prevents overwrite of the data during the data move operation. The SYNC instruction at the end of the data move process ensures that the memory subsystem retains the data coherency exists among the various processing units.

However, a large portion of the latency in performing data operations, such as with memory moves, involves the actual movement of the data from the first real address location (the source location) to the second real address location (the destination location). During such movement, the data is pinned to a specific real address to prevent the occurrence of a manage exception. The processor has to wait on completion of the address translation by the TLB and acquisition of the lock before proceeding with completing the operation and subsequent operations. Developers are continually seeking ways to improve the speed (reduce the latency) of such memory access data operations.

SUMMARY OF THE INVENTION

A method within a data processing system in which a processor handles conflicts, which occur during performance by an asynchronous memory mover of an asynchronous memory move (AMM) operation. The asynchronous memory mover performs an asynchronous memory move (AMM) operation by which the actual data is moved from a source to a destination memory location, independent of the processor. The memory mover sets a flag bit to indicate that the asynchronous memory mover is currently performing an AMM operation at the memory. When the processor receives a memory access operation, the processor checks the value of the flag bit before issuing the new memory access operation, and checks the associated address of the AMM operation to determine possible address conflicts. The processor then evaluates and responds to address conflicts to prevent corruption of data during an AMM operation.

BRIEF DESCRIPTION OF THE DRAWINGS

The novel features believed characteristic of the illustrative embodiments are set forth in the appended claims. These embodiments, however, will best be understood by reference to the following detailed description of illustrative embodiments when read in conjunction with the accompanying drawings, wherein:

FIG. 3 is a block diagram illustrating components of an example asynchronous memory mover (or AMM logic), according to one embodiment;

FIGS. 4A-4E are a block diagram representations of an example AMM STore instruction, two example AMM Terminate ST instructions, and two example ST SYNC instructions, according to the described embodiments;

DETAILED DESCRIPTION OF ILLUSTRATIVE EMBODIMENTS

A. Overview

Figure 1A:
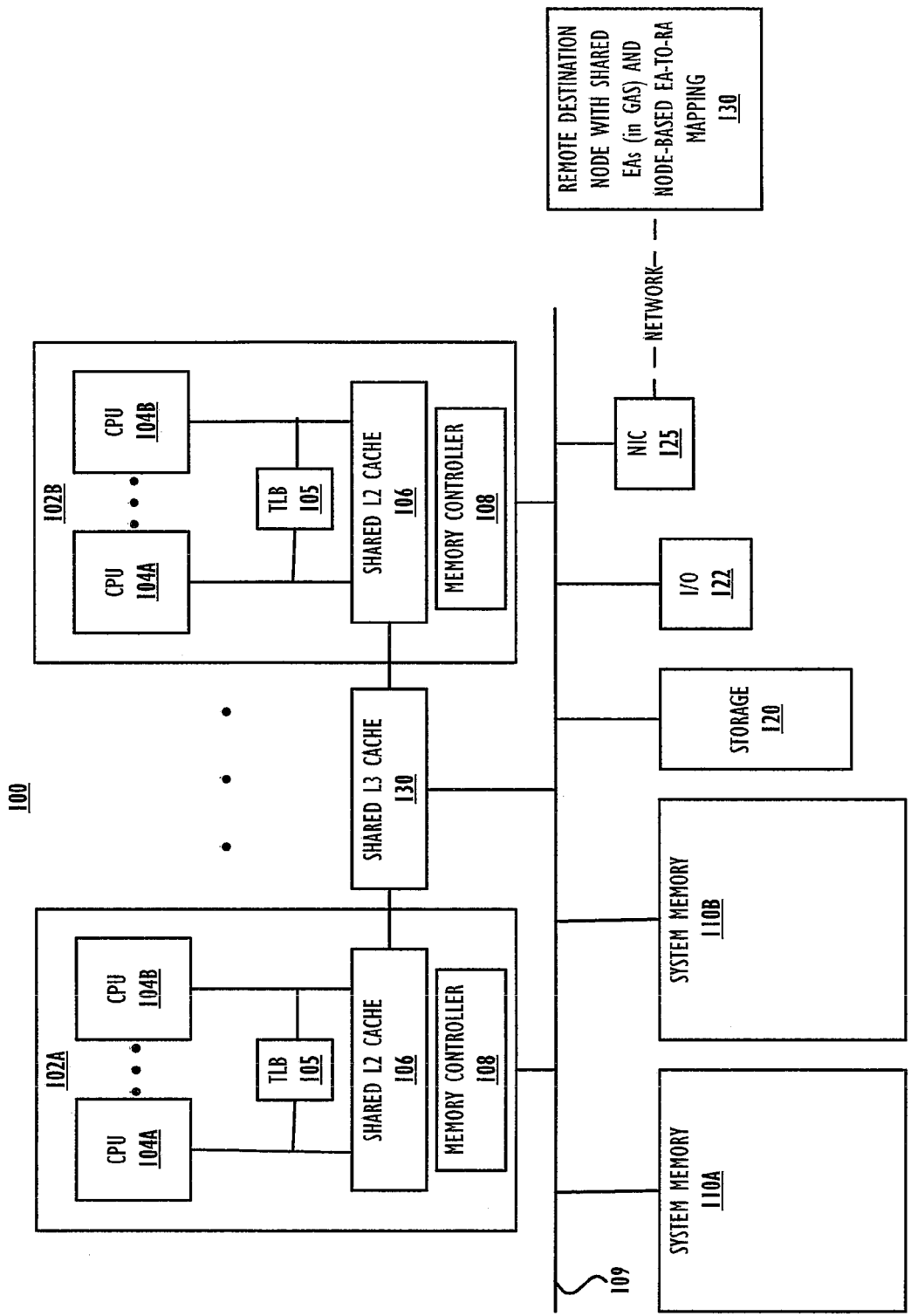
FIGS. 1A-1C are block diagrams illustrating three configurations of a symmetric multiprocessor data processing system (SMP) within which a processor may initiate execution of an asynchronous memory move (AMM) operation, according to one embodiment.

The embodiments illustrated and described herein provide a data processing system and method, which enable completion of an asynchronous movement of data from a first physical memory location (source) to a second physical memory location (destination), with the processor performing only an effective address (processor level) move of the data. That is, the processor utilizes the effective addresses, in lieu of the real addresses, to trigger initiating and processor level completion of the move operation in effective address space from a source effective address to a destination effective address.

An asynchronous memory mover (which is an off-chip logic device/component) performs the actual movement of data within the real address space. However, once the process completes the initiation and transfer of the data from the source effective address to the destination effective address, the process forwards the address and other relevant parameters to registers accessible to the asynchronous memory mover, to trigger the asynchronous memory mover to complete the actual data movement. The asynchronous memory mover (hereinafter referred to simply as AMM or AMM logic), completes the asynchronous memory move operation (referred to hereinafter as an AMM operation).

Notably, the embodiments refer to the operations and the devices as "asynchronous" to highlight the processor continues processing other operations, received subsequent to the receipt and execution of the instruction to move data, while the AMM mover continues the actual move of physical data within the real memory space. The AMM operation thus proceeds in parallel or concurrently with other processor operations and AMM operations as well (in one embodiment).

Modifications and/or enhancements to the instruction set architecture (ISA) includes providing support various new instructions that the processor executes to trigger completion of an AMM operation and/or stop or pause or check the status of completion of an AMM operation.

In the following detailed description of exemplary embodiments, specific exemplary embodiments are described in sufficient detail to enable those skilled in the art to practice the various embodiments, and it is to be understood that other embodiments may be utilized and that logical, architectural, programmatic, mechanical, electrical, and other changes may be made without departing from the spirit or scope attributed to the embodiments. The following detailed description is, therefore, not to be taken in a limiting sense, and the scope of the embodiments is defined by the appended claims and their equivalents.

Within the descriptions of the figures, similar elements are provided similar names and reference numerals as those of the previous figure(s), except that suffixes may be added, when appropriate, to differentiate such elements. Where a later figure utilizes the element in a different context or with different functionality, the element is provided a different leading numeral representative of the figure number. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. For example, as utilized herein, the term "data" should be given the broadest possible interpretation as referring to any content stored within a first memory location that may be moved to another memory location. Thus, data may include instructions, pseudo code, and the like, for example.

B. Hardware Features

Figure 1B:
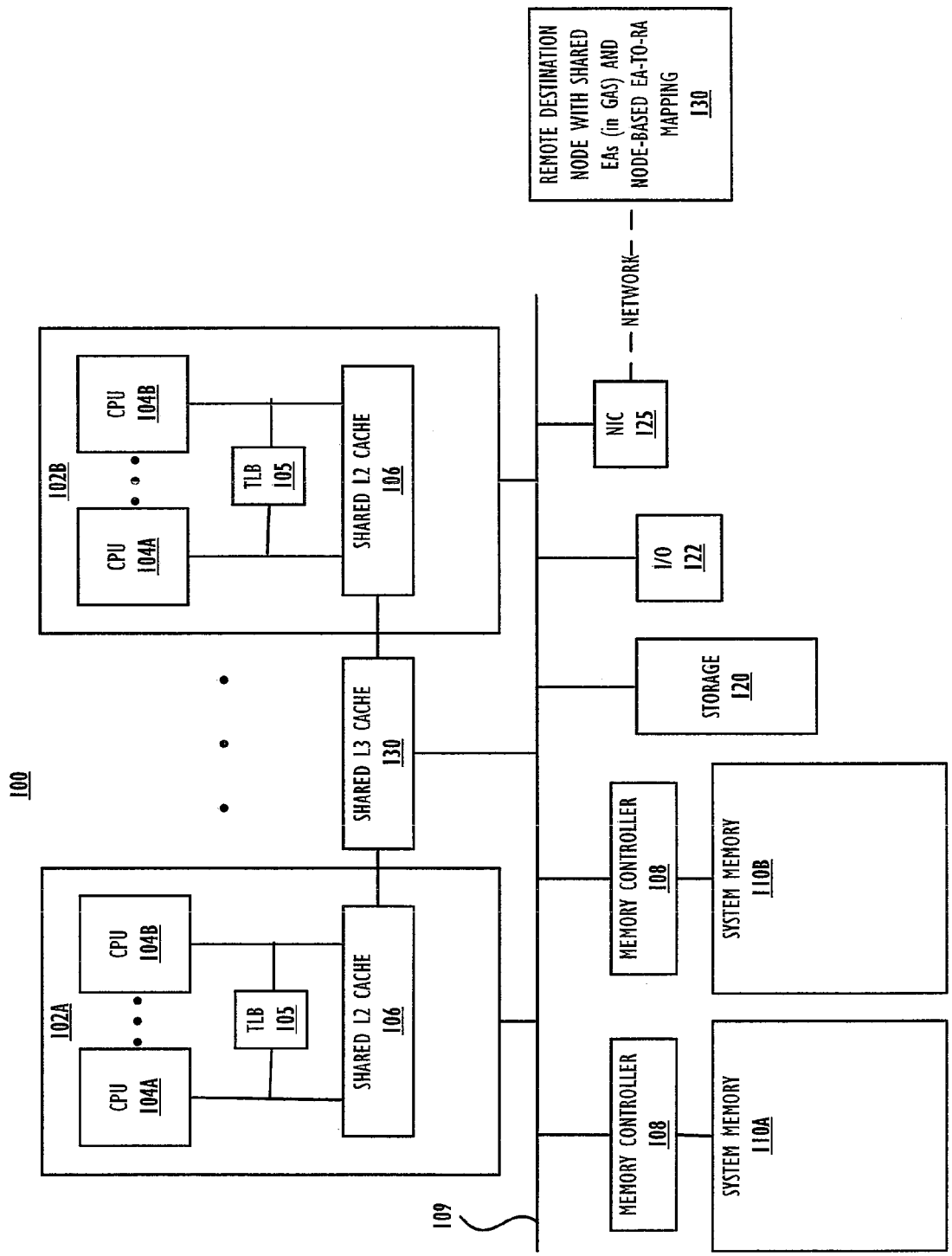
Figure 1C:
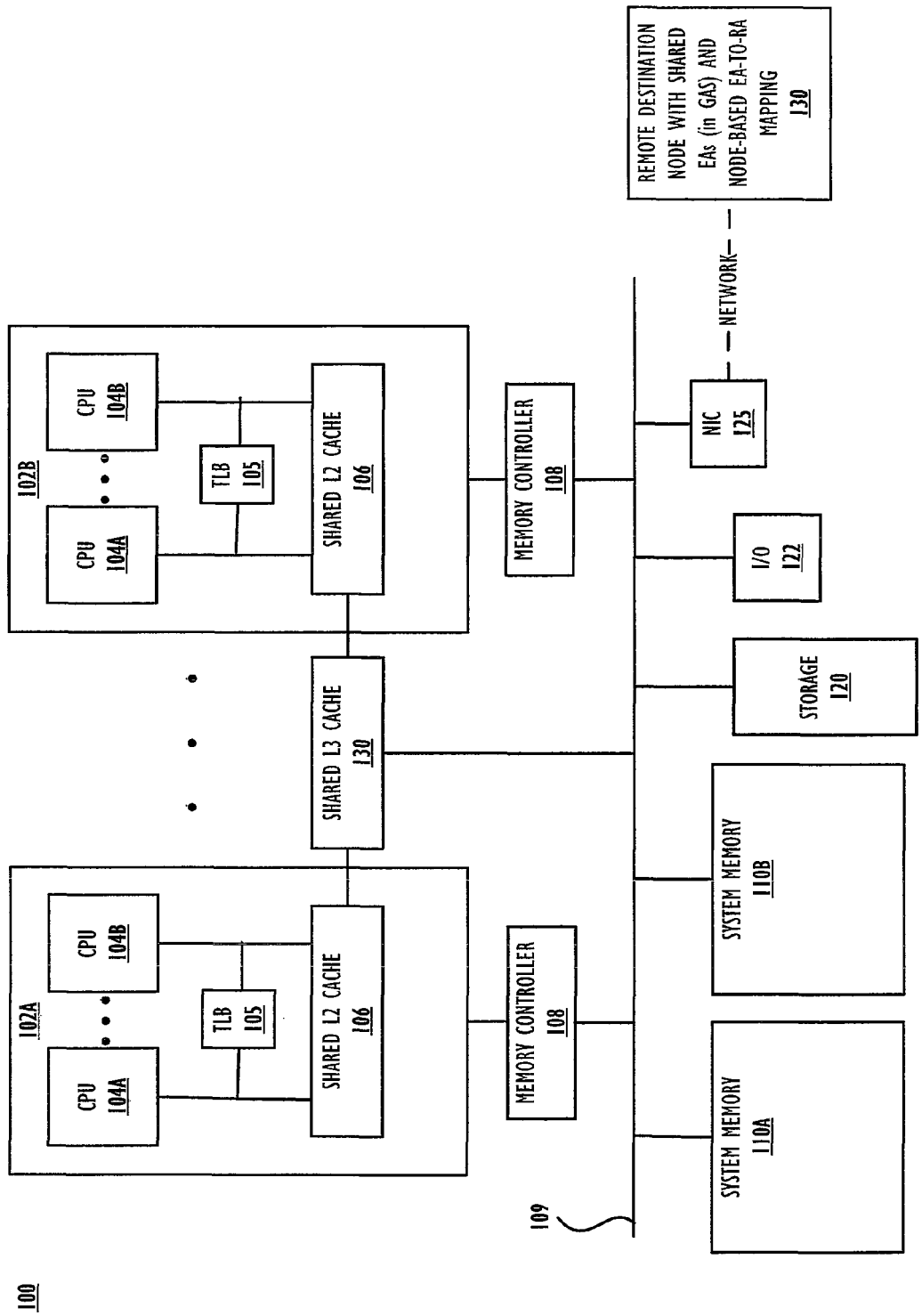

Turning now to the figures, and in particular to FIGS. 1A, 1B and 1C, which illustrate three configurations of an example SMP 100 within which the embodiments are advantageously implemented. Because the three SMPs have similar components, the three configurations are described with a single description. SMP 100 comprises a plurality of processor modules/chips, two of which, processor chip 102A and 102B, are depicted. Processor chips 102A, 102B each comprise one or more central processing units (CPU), although for illustrative purposes, two such CPUs, CPU 104A, 104B, are shown on each example chip. Throughout the description herein, the terms CPU and processor will be utilized interchangeably as referring to the same component.

In the configuration of FIG. 1A, processor chips 102A, 102B include shared L2 cache 106, a translation look-aside buffer (TLB) 105, and on-chip memory controller 108. Processor chips 102A, 102B of FIG. 1B also includes shared L2 cache 106 and TLB 105; However, the memory controller 108 is located off-chip, connected to the processor chip 102A, 102B and to memory 110A, 110B via a system bus 109 and memory bus (not referenced), respectively. While illustrated on-chip within the illustrative embodiment, other embodiments may provide the shared L2 cache as a separate component that is physically located off the processor die. As further illustrated, L2 cache 106 connects to shared L3 cache 130.

Processor chips 102A, 102B and L3 cache 130 connect to system memory 110 via system interconnect (or system bus) 109. Actual access to memory 110A, 110B is controlled by memory controller 108, regardless of the controller's location on or off chip. It is further appreciated that the mechanism for connecting the processor chips 102A, 102B and L3 cache to memory 110A, 110B may be a switch, which directly coupled each device to each other. The embodiments of data processing system 100 provide a distributed system memory configuration, by which two separate system memories, memory 110A, 110B, and corresponding memory controllers 108 connect to the system bus, as a representative set of distributed memory. Memory controller(s) 108 connect to the memory and/or processor chips in one of three different configurations, which are illustrated by FIGS. 1A, 1B, and 1C. In other embodiments, the distributed memory may comprise any number of individual memory components connected via the system bus 109 or other connection method to SMP 100. Also, while shown as a distributed system memory 110A, 110B, other embodiments may provide for a configuration having only a single system memory.

Other components provided within SMP 100 include physical storage 120, input/output devices and corresponding controllers, generally represented as I/O 122, and a network interface card (NIC) 125. As will be explained in greater detail below, NIC 125 enables SMP 122 to connect to and communicate with other remote devices, such as remote destination node 130, via a network, such as the Internet (not shown). Remote destination node 130 may be similarly configured to SMP 100, but not necessarily so. More importantly, in one embodiment, remote destination node 130 shares a global address space (GAS) with SMP 100, such that both devices utilize a same set of effective addresses (EAs), some of which are mapped to local memory on each device. With this configuration of shared EAs, the processor may perform operations, which source data to or from the physical memory of the remote destination node 130.

The illustrated configuration of processors and memory subsystem (of caches and system memory) within data processing systems are presented herein for illustrative purposes only. Those skilled in the art understand that various functional features of the described embodiments are fully applicable to a system configuration that comprises a single CPU and/or a single processor chip, as well as a single system memory. The functional features of the embodiments described herein therefore apply to different configurations of data processing systems that (a) include some mechanism or logic for processing asynchronous memory move operations using EAs within a store operation and (b) provide a platform that supports the various functional features described herein.

B.1 Asynchronous Memory Mover (Special Off-Chip AMM Logic & TLB)

Figure 2:
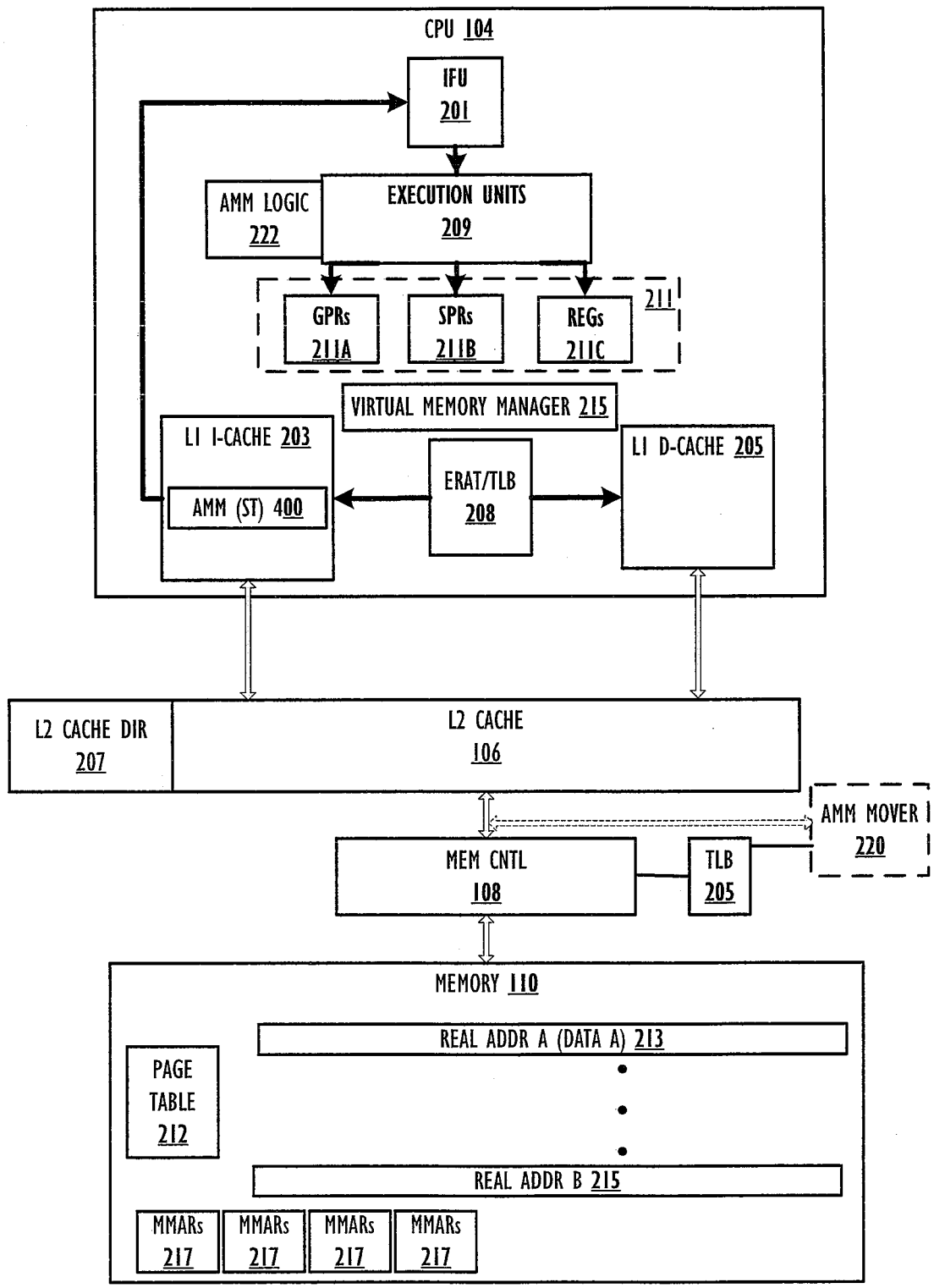
FIG. 2 is a block diagram illustrating an example configuration of components utilized to perform AMM operations, according to one embodiment.

FIG. 2 provides a more detailed illustration of the functional components within a processor-to-memory configuration 200. Processor-to-memory configuration 200 depicts a more detailed view of the connection between components of example processor chip 102 (FIG. 1) and connected memory subsystem that enable/support AMM operations. As shown, CPU 104 includes instruction fetch unit (IFU) 201, or an instruction sequencer, which fetches instructions, such as AMM STore instruction 400 (described below with reference to FIG. 4), from L1 I-cache 203.

CPU 104 also comprises execution units 209 (not individually identified). Execution units perform operations on data based on the received instructions. In some operations, the execution units 209 also provide data to or utilize data from various processor registers 211, of which general purpose registers (GPRS) 211A, special purpose registers (SPRs) 211B and other registers 211C are shown.

Figures 3, 4A:
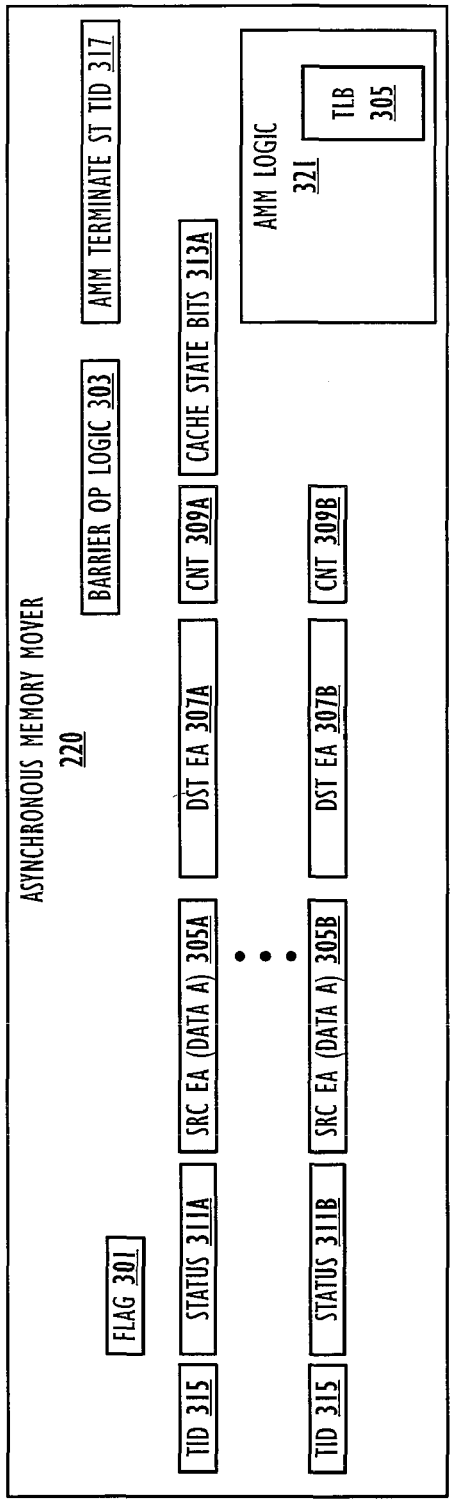

As shown, processor-to-memory configuration 200 comprises AMM mover, utilized to perform several of the novel features described by the embodiments herein. In the described embodiments, AMM mover 220 is located off-chip, and couples to the memory controller 108 via the system bus (or interconnect switch). Also, AMM mover 220 includes or is coupled to off-chip TLB 205. CPU 104 includes AMM logic 222 by which CPU 104 detects AMM ST instructions (and other AMM related instructions) and communicate information to/from AMM mover 220. FIG. 3, described below, provides a more detailed description of AMM mover 220 and the functional elements associated therewith. As described in greater detail below, in one embodiment, the CPU 104 communicates with the AMM mover 220 utilizing particular ones of the processor architected registers 211.

In addition to L1 I-cache 203, CPU 102 also includes a L1 D-cache 205, which together represents a bifurcated L1 instruction and data cache. The L1 caches 203,205 couple to translation lookaside buffer (TLB) 208 (or Effective-to-Real Address translation table (ERAT)), and also couple to lower level, L2 cache 106. L2 cache 106 has an associated cache directory 207 for updating cache states and tracking addresses of cache lines and moved data. L2 cache 106 couples to system memory 110, perhaps indirectly through an L3 or even lower level cache.

System memory 110 contains a plurality of physical memory locations for storing data (and instructions), which locations are accessible via an associated real address. System memory 110 also contains page table 212, which memory controller 108 utilizes to find real address spaces within system memory 110. As provided, memory 110 also provided at least two real address spaces, namely, real address space A 213, corresponding to a first (originating) memory location, and real address space B 215, corresponding to a second (destination) memory location within the described embodiments. Finally, according to the described embodiment, memory includes a plurality of memory-mapped architected registers (MMARs) 217, which the compiler or operating system allocates to the processor when the compiler binds the application to enable communication with the AMM mover 220.

B.2 AMM Mover Components (AMM Logic)

FIG. 3 provides a more detailed view of the internal structure of AMM mover 220. As provided, AMM mover 220 comprises processing logic 311 and a series of registers for storing information related to received and ongoing AMM operations. Within or associated with processing logic is TLB 305, which may be synonymous with TLB 205 (FIG. 2, illustrated external to AMM mover 220) depending on the location of TLB 305 relative to AMM mover 220. Included among the registers are AMM operation-in-progress flag 301, status/control information 311A, source effective address (EA) 305A, destination EA 307, data size or count (CNT) 309A, and cache state bits 313A. AMM operation-in-progress flag 301 provides a mechanism by which a processor may quickly check for whether a previously-initiated AMM operation is still ongoing. Thus, flag 301 may be a single bit flag with a "1" value indicating the presence of an ongoing AMM operation and a "0" value indicating that there is no AMM operation currently in progress. Data size or count (CNT) register 309 stores the size/amount of data being transferred to the destination by the AMM operation. Status/Control register 311A provide some additional information about the actual status of an ongoing AMM operation. Some possible status indicators include: paused, stopped, conflict detected, completed, and the like.

Notably, AMM mover 220 may simultaneously maintain multiple sets of registers (illustrated by "A . . . B" of several of the above described registers), with each set allocated to storing information for a different AMM operation that may be concurrently performed. The performance of overlapping or concurrent AMM operations is described in detail below.

Depending on the embodiment, AMM mover 220 may also include cache state bits 313A, which indicate the cache state to associate with the moved data at the destination and/or following cache injection of the moved data. Cache state bits 313A may be individually assigned and unique to each entry or preset by the processor (or AMM mover) to provide a single cache treatment of all AMM operations. AMM mover 220 also provides control registers/logic, including: barrier operation logic 303 for tracking (or generating) an AMM barrier operation or AMM SYNC; AMM Terminate Store 317 for storing the transaction ID (or address) of an AMM operation that should be terminated once movement of a current segment of the data completes; and Node or transaction ID (NID/TID) 315, utilized as an additional addressing feature for cross-node AMM operations. The functionality of each of the illustrated components of AMM logic 202 is described at the relevant sections of the document.

Barrier operation logic 303 enables AMM logic to generate and/or issue a barrier operation to prevent other operations from proceeding until the AMM operation completes. Or, in an alternate embodiment, barrier operation logic 303 actually performs the barrier operation before performing the AMM operation to ensure that the source data being moved includes the latest updates from across the SMP. In yet another embodiment, the barrier operation logic 303 provides the AMM mover 220 for generating a specialized barrier or synchronization operation by which the AMM mover 220 performs specialized system synchronization, where only certain operations (targeting overlapping EAs with the AMM ST instruction) are required to complete execution before the AMM operation begins.

Finally, AMM mover 220 includes or is associated with an off-chip (i.e., not on the processor chip) TLB 205. Off-chip TLB 205 enables AMM mover 220 to perform the EA to RA translations independent of the CPU 104 (FIG. 1), so that the CPU 104 is not directly involved in the actual physical movement of data once the CPU 104 initiates the data move in real address space.

C. ISA Support for Initiating Asynchronous Memory Moves (AMM ST Instruction)

In order to support asynchronous memory moves, the instruction set architecture (ISA) of the SMP 100 (see FIGS. 1A-1C) is modified to include a specialized store (ST) operation, the AMM ST 400 (see FIG. 2). The AMM ST instruction triggers the processor to utilize the effective addresses (rather than real addresses) to execute a processor-level memory move of data from a first (source) effective address to a second (destination) effective address. Once the processor receives an AMM ST instruction, the processor utilizes the EAs within the instruction to launch the data move operation and collect information that enables performance of the AMM operation by the AMM mover. The use by the processor of effective addresses eliminates the requirement for an EA-to-RA translation to occur at the processor before the processor initiates the data move. Also, the data move no longer has to be pinned to a particular memory location and exceptions conditions are managed on the fly. Thus, unlike conventional move operations, which the application triggers by providing a sequence of instructions that include a LD instruction, ST instruction and a SYNC, the described embodiments enables utilization of a single instruction to complete a memory move by enhancing the ISA to include support for a single AMM ST instruction.

C1. Compiler and/or Hardware Generation of AMM ST Instruction from Instruction Stream In one embodiment, a compiler or processor generates the AMM ST instruction from a particular sequence of instructions within an instruction stream. The ISA for the data processing system supports the SMM ST instructions. The compiler or processor monitors the instruction stream (during compilation or during execution of) the application. The compiler then generates an AMM ST instruction when the compiler detects a pre-defined sequence of instructions (common code loops) that together perform a memory move operation. An example instruction stream that triggers the compiler to generate an AMM ST instruction or which causes the processor to initiate an AMM operation includes the following:

LD ADDR1, GPR 14
ST ADDR2, GPR 14
ADDi immediate, GPR 22
BNE 0, GPR 22 (branch not equal zero)

With this implementation, the compiler allocates the particular GPRs (e.g., GPRs 211A, FIG. 2) to perform memory moves. These GPRs are accessible to the processor as well as to the AMM mover. Section G below provides a description of further use of these GPRs to perform an AMM operation. With the CPU implementation, the CPU includes a hardware logic that monitors the instruction stream to look for specific routines (common code loops) that together execute a move operation. When the CPU detects the particular code stream, the CPU triggers the asynchronous memory move operation via the AMM mover.

Notably, in one implementation, whenever the CPU receives a first instruction in the above sequence of instructions, the CPU buffers the instruction and subsequently received instruction to determine if the buffered instructions constitutes the full sequence that performs an asynchronous memory move. Where the sequence does constitute an asynchronous memory move, and the data processing system supports such a move operation, the CPU then replaces the individual operations with a single AMM ST operation and performs the initial phases of the asynchronous memory move utilizing the effective addresses of the source and destination memory addresses. The CPU also paces the effective addresses and other parameters in the corresponding (identified) GPRs.

C3. AMM ST Instruction

With reference now to FIG. 4A, the illustrative embodiment provides a 32 bit AMM ST instruction 400. The instruction sequencer retrieves this AMM ST instruction 400 and forwards the instruction for execution/processing by the CPU. The CPU then executes the AMM ST instruction 400 to provide the various functional processes described herein and which the logic of the CPU are designed to support. As shown, AMM ST instruction 400 comprises transaction ID (TID) 415 (which is optional, as the TID may be assigned by the AMM mover 220), source (SRC) effective address (EA) 405, destination (DST) EA 407, and count (CNT) 409, which provides the number of bytes (or size of data) being moved. As their names imply, destination address entry and source address entry store the destination and source effective addresses, respectively of the asynchronous memory move. These EAs correspond to real addresses (RAs) of the physical memory location from and to which the data are being physically moved. The AMM mover 220 (FIG. 2) provides the EAs to the TLB 205 (FIGS. 2, 3) to determine the corresponding RAs during the initial stages of completing the AMM operation. The CNT entry 409 of the AMM ST instruction 400 provides the length of the data move operation (amount of bytes of data being moved). Further, the status/control entry 411 holds various types of status and/or control information for the AMM operation.

Notably, and as is illustrated by FIG. 4A, and with reference to FIG. 3, the content of the registers within AMM mover 220 correspond to the entries of an AMM ST instruction 400. This similarity in the entries enables the processor to quickly assign the AMM mover 220 values within each register taken directly from the AMM ST instruction 400. Thus, when the compiler provides the AMM ST instruction 400 within the instruction stream, the CPU responds to receipt and execution of the AMM ST instruction 400 by forwarding the entries within the instruction to corresponding registers within the AMM mover 220.

D. ISA's AMM Terminate Instruction & Status Check Instruction & Termination of In-Flight Asynchronous Memory Move In addition to the AMM ST instruction, the embodiments further include enhancing the ISA with other instructions to enable the CPU to control completion of the AMM operation. The instruction sequencer retrieves these instructions, which are executed by the CPU to perform the respective functional operation. One embodiment, illustrated by FIGS. 4B-4C, provides an AMM Terminate instruction 420,430, which instruction the AMM mover 220 utilizes to stop an ongoing AMM operation. Two different implementations of AMM Terminate instructions are provided by respective FIGS. 4B and 4C. In FIG. 4B, the AMM Terminate instruction 420 is an AMM ST instruction that includes AMM terminate operands 421 within the status/control field. In FIG. 4C, the AMM Terminate instruction 430 is a special terminate instruction, which also includes AMM terminate operands 421. Depending on the processing system, one or both types of instructions (420, 430) are supported within the ISA and are placed in the instruction stream (generated by the compiler) for execution by the processor based on a desire/need to terminate the processing of a previously-issued AMM ST instructions (400).

As shown, the ISA-supported AMM Terminate instructions 420,430 includes a TID 415, the EA(SRC) 405 and EA(DST) 407 of an existing/ongoing AMM operation, as well as the AMM terminate operands 421. With the first configuration, the AMM Terminate instruction 420 also includes CNT entry 409.

The AMM Terminate instruction 420, 430 includes the EAs associated with the specific AMM operation(s) to be terminated, since multiple AMM operations may be concurrently performed. The AMM Terminate instruction 420,430 terminates an ongoing AMM operation where the AMM operation has the same EAs. In one embodiment, the AMM Terminate instruction 420, 430 may cause the CPU (or AMM mover) to terminate all existing AMM operations, which have not completed.

The detection of an AMM Terminate instruction 420, 430 in the instruction stream (by the CPU) or on receipt by the AMM mover 220, causes the AMM mover 220 to immediately stop execution of the associated AMM operation. In the described embodiment, the AMM mover 220 responds to an AMM Terminate instruction 420, 430 by: (a) matching the instruction (400) to its corresponding AMM operation; (b) triggering the AMM operation to complete the store of the segment of data currently being moved; (c) signaling the AMM operation to not initiate the move of any of the remaining segments of data; (d) recording the address and other information pertaining to which parts (segments) of the data move completed; and (e) updating a status field for the AMM operation to indicate that the AMM operation is in a partially done state. In one embodiment, the reason for the partially done state (i.e., termination by the processor) is also recorded within the status field.

In an alternate embodiment, the AMM mover 220 may also restore the original data from both the SRC and DST locations. To complete this restoration, during compilation of the application and/or during initialization of the SMP hardware, the OS assigns the AMM a temporary buffer for memory move completion and restoration processing. Also, the registers assigned to the now terminated AMM ST instruction may be reset to their original value or simply set to a default/zero value.

Thus, in one embodiment, the CPU that initiated the memory move may terminate the AMM operation prior to completion by issuing a second, ISA-supported instruction. With the execution of this AMM Terminate instruction 420, 430, the CPU also restores the GPR registers (e.g., GPR14 and GPR22), which are restored to their original states whenever an interrupt occurs to prevent completion of the data move.

E. Execution of the AMM ST Instruction and Performance of the AMM Operation

Figure 5:
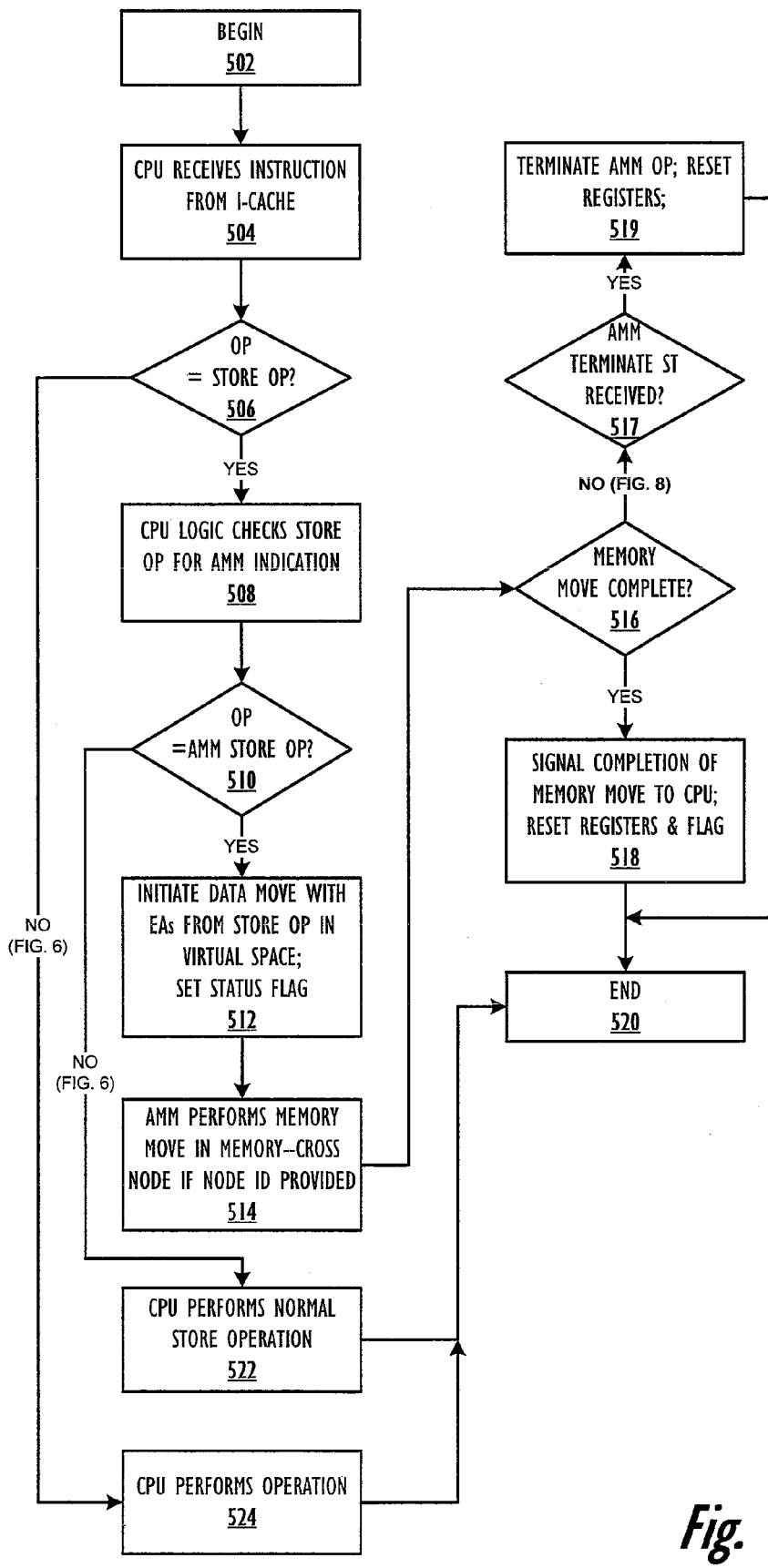
FIG. 5 is a flow chart illustrating the method by which the processor executes an AMM ST instruction and triggers performance of the AMM operation, according to one embodiment.

When the CPU 102 (FIG. 1) receives an AMM ST instruction (retrieved by the instruction sequencer from the instruction stream), the CPU, in concert with the AMM 220, performs a series of functional steps, which are illustrated by FIG. 5. The method of FIG. 5 begins at block 502 and proceeds to block 504 at which the CPU receives an instruction from the I-cache. The CPU determines at block 506 whether the instruction is a ST instruction, and when the instruction is not a store instruction, the CPU executes the instruction to perform the associated operation, as shown at block 524. When the instruction is a store instruction, the CPU passes the store instruction to AMM logic 222 (FIG. 2), which checks the arguments within the instruction for an indication of whether the store is a regular store or an AMM ST instruction 400, at block 508. At decision block 510, the CPU determines if the store instruction is an AMM ST instruction. When the store instruction is not an AMM ST instruction, the CPU performs a normal store operation as provided at block 522.

When the instruction is a AMM ST instruction 400 (FIG. 4), the AMM retrieves the effective addresses (EAs) and count value from the instruction, stores the EAs and count value in respective registers, and initiates the data move operation using the EAs, as shown at block 512. The AMM also sets the AMM status flag, to indicate that an AMM operation is in progress.

In initiating the data move operation, the CPU performs a read of the data from the source effective address. Once the read completes, the CPU then tags the data with the destination effective address. This tagging, or re-addressing of the data occurs in effective address space before the AMM mover or memory controller performs a translation of the source and destination effective addresses into their corresponding real addresses. Once the processor-level (EA) move completes, the processor proceeds as if the actual data move was completed.

With the data move performed within the effective address space, the CPU then triggers the AMM mover to complete the actual move of physical data from the first real memory location (the source) to the second location (the destination), as provided at block 514. Specifically, the processor passes the EAs and other data to the AMM mover which passes the source and destination effective address to the TLB. The TLB translates the effective addresses to their corresponding real addresses, and then the AMM mover performs the data move in a background process that does not involved the processor.

Following the EA-to-RA translation, the AMM mover coordinates with the memory controller to physically move the data directly from the first memory location (e.g., location A 203), having a first real address A, to the second memory location (e.g., location B 207), having a second real address B. Ideally, with this embodiment, data travels along a direct path that does not include the CPU 104 or processor chip/module 102. The actual movement of data into the memory is controlled by memory controller 108, which may be on-chip or off-chip, and which controls other accesses to the memory 110, independent of any processor involvement and while the AMM operation is completing within the memory.

With the memory move in progress, the CPU waits (as provided at block 516) for receipt of an indication of the completion of the actual physical move. While waiting, the CPU also monitors the execution stream for the presence of an AMM Terminate instruction. Thus, as shown at block 517, the checks each received instruction for an indication that the instruction is an AMM Terminate instruction. When the CPU receives such an instruction, the CPU passes the instruction to the AMM, and the AMM terminates the ongoing AMM operation, as shown at block 519. In this scenario, the memory move never actually completes. Also, in one embodiment, the AMM resets all the registers allocated to that AMM operation to the register's original or default state.

The AMM mover waits for the completion notification for the actual data move to the real address space and signals the completion with a reset of the flag. When the move completes, the memory controller signals the AMM, which responds to the receipt of the completion notification by resetting the flag to signal the completion to the CPU and resetting the status/control, address and count registers, as shown at block 518. The process then ends at block 526.

F. Parallel/Overlapping Processing Beyond Initiation of AMM Operation

In one embodiment, the processor enables parallel execution of the AMM operation along with other memory access operations. This embodiment enables the CPU to complete other useful work in parallel with the memory move. The CPU (or compiler during compilation of the application code) continually checks for effective address conflicts, and proceeds with execution until the compiler detects such a conflict.

In one embodiment, the ISA assigns a single bit within the CNTL bits of the AMM ST instruction 400 to indicate when the CPU may perform the memory move asynchronously with other operations. The value of the asynchronous bit tells the CPU whether to execute other work in parallel (asynchronously) or in sequence (synchronously) relative to when the memory move operation is ongoing. An asynchronous setting allows for concurrent/parallel execution, while a synchronous setting prevents parallel execution.

Thus, for example, the thread that issued the AMM ST instruction 400 continues processing the subsequently received instructions within that thread. The AMM operation proceeds in parallel with the other work being performed by the thread, in a fully asynchronous manner. For large data moves, the AMM may perform the single instruction in stages, while letting other tasks complete in parallel.

In one embodiment, the processor performs a pseudo-speculative processing, but does so with the AMM flag and status bits set to indicate the location of the move within the execution stream when the other instructions are executed. In another embodiment, the processor also utilizes the special architected registers to store state information that would enable the processor to restore back to the execution point preceding the overlapping execution. Thus, the described embodiments provide support for three points of parallel ("speculative") execution: (1) beyond the move operation; (2) past a barrier operation; and (3) beyond completion of a partial move. The latter two are described below. The thread thus continues to run in parallel with the execution of the AMM operation. However, when the first thread executes an AMM op beyond a barrier, the processor ensures that no other thread has access to the store (destination) data.

F.1 Launching Multiple Overlapping AMM Operations

In one embodiment, the CPU 104 and the AMM logic 221 (FIG. 2) may concurrently launch multiple AMM operations to move data to different, non-overlapping, memory locations. In this embodiment, the CPU 104 or the AMM mover 220 checks for conflicts with the EA(DST), taking into consideration the length of the data move to ensure that no two AMM operations can target the same EAs or overlap in the EA space (e.g., EA(DST1)+CNT1 not equal to EA(DST2), where DST1 and DST2 respectively represents the first and second destination addresses). Once the CPU and/or AMM mover verifies that no overlap exists with the destination addresses, the AMM initiates the second AMM operation. If a conflict exists, the CPU/AMM responds by: (a) holding the second AMM operation until the AMM receives a completion notification for the first AMM operation; or (b) giving deference to the second received AMM ST instruction 400 as providing the most current version of the data within the destination address space, stopping the first AMM operation; and initiating the second AMM operation. The second response assumes that the second, later-issued AMM operation moves data into a memory location that completely overlaps the location in which the data of the first AMM operation is being moved.

In one embodiment, in order to monitor and uniquely distinguish completion of each separate AMM operation, the AMM mover provides a unique tag that is appended to the address tag of the read operation sent to the source address. The tag may be stored in an M bit register, where M is a design parameter selected to support the maximum number of possible concurrent AMM operations on the system, such that each AMM operation has a different value placed in the register.

Figure 6:
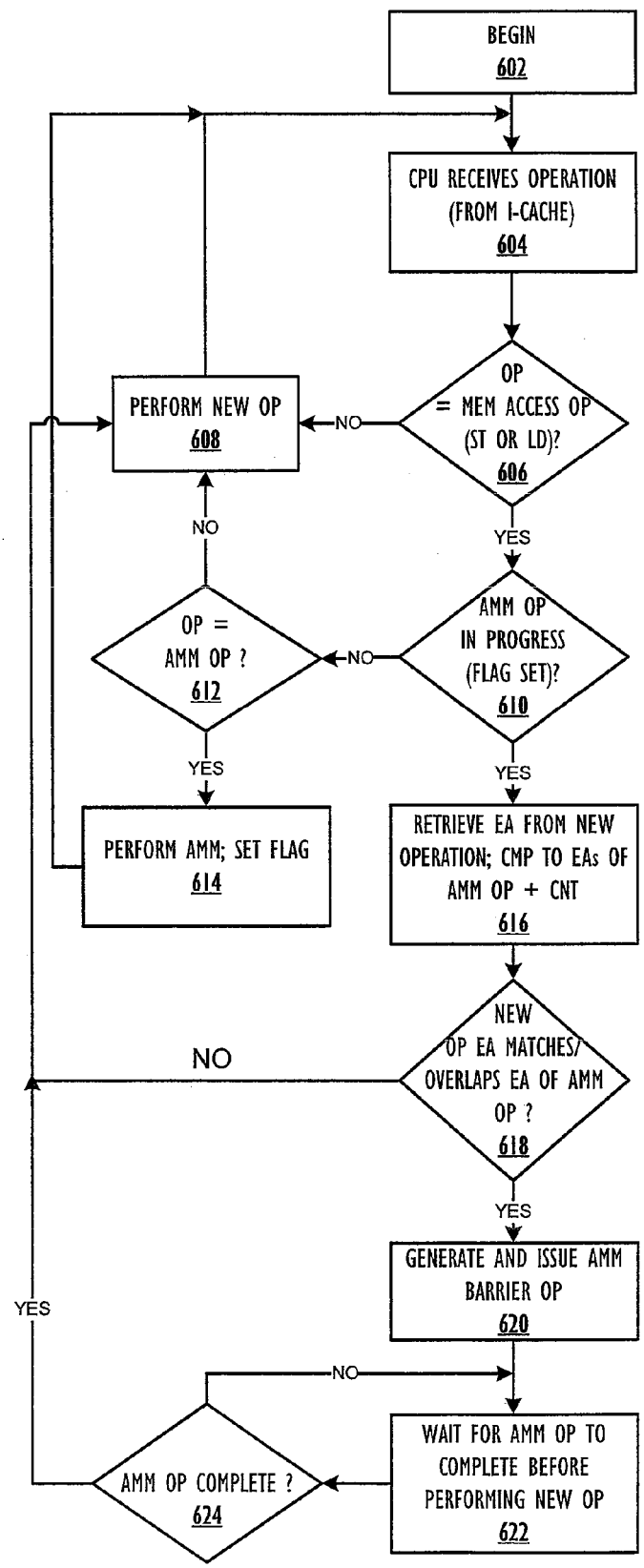
FIG. 6 is a flow chart illustrating the method by which the processor generates and issues an AMM barrier operation in response to detection of an address conflict, according to one embodiment.

FIG. 6 illustrates the method by which the CPU (and/or AMM mover) responds to requests to issue multiple overlapping AMM operations, according to one embodiment. The method of FIG. 6 begins at block 602, and proceeds to block 604, which illustrates the CPU receiving an instruction from the I-cache. Similar to FIG. 5, the CPU determines at block 606 whether the instruction is for a memory access operation (i.e. a LD or ST instruction). When the new instruction does not provide a memory access operation, the CPU performs the new operation, as shown at block 608. When the instruction is for a memory access operation, the CPU next determines at block 610 whether the AMM mover is performing another (previous) AMM operation. The determination may entail a simple check of the value of the flag (301, FIG. 3). Assuming the AMM mover does not have an ongoing AMM operation, the CPU next determines whether the instruction is for an AMM operation. When the instruction triggers an AMM operation, with no existing (i.e., currently executing) AMM operations, the CPU initiates execution of the AMM ST instruction and triggers the AMM mover to perform the AMM operation, as shown at block 614, and the CPU (or AMM mover) also sets the flag.

However, when the AMM has a currently executing AMM operation, the CPU retrieves the EA from the new AMM ST instruction and compares the EAs with those of the existing AMM operation, as shown at block 616. Then, the CPU determines, at block 618, whether the EAs match (or overlap). If no match/overlap exists with the EAs, the CPU performs the new operation at block 608. However, when matching EAs or overlapping EAs exists, the CPU (or AMM mover) automatically generates and issues an AMM barrier operation (or AMM SYNC 450, see FIG. 4E, described below), as provided at block 620. Assuming generation of the barrier by the CPU, the CPU then passes the relevant parameters, indicating the AMM barrier operation, to the AMM mover. The CPU (or/and AMM mover) then waits for the AMM barrier op to complete, as shown at block 622, and checks, at block 624, for receipt of a notification of completion of the previous AMM operations at the physical memory. The CPU (nor the AMM mover) does not perform the new AMM operation (block 608) until the CPU and AMM mover receives the notification of completion for the AMM barrier operation, which indicates completion of the previous AMM operation.

By enabling the launch of concurrently executing AMM operations, the AMM mover allows the CPU to completes even more other types of work rather than wait until the first AMM operation has fully completed (i.e., all data are physically moved from the source memory location to the destination), before being able to execute another AMM operation. The ability to perform overlapping/concurrent moves is advantageous since the AMM operation will typically not affect any other processes implemented, while the actual data move is ongoing.

G. Asynchronous Memory Move Across Physical Nodes

One embodiment enables a non-SMP implementation by which the processor and AMM mover completes the AMM op across two physically distinct nodes connected via a network. FIG. 1 illustrates an example remote node 130 connected via a net work to the SMP 100. The nodes may be connected via a local network (such as a local area network—LAN) or connected via a larger network, such as a wide area network, of which the Internet is an example. One embodiment may involve use of a second-type AMM ST instruction 400 that enables cross-node memory move operations. With this embodiment, when the compiler recognizes that the operation involves a cross-node AMM operation, the compiler generates a cross-node AMM ST instruction 400, which includes node identifying information.

However, in another embodiment, the compiler simply adds some additional directional information in the status/control entry of the AMM ST instruction 400. Thus, for example, the compiler includes a destination node ID within the status entry. The status bits may indicate a particular destination memory or cache on the remote node. The CPU provides that information to the AMM mover. The AMM mover then utilizes the node ID to determine the remote node on which the destination memory location exists.

With this embodiment, the operating system may establish a global addressing function by which the effective addresses utilized by the application are shared among a group of remotely-connected nodes (perhaps as a result of the nodes executing tasks of a shared job). Thus, the destination EA provided within the AMM ST instruction 400 is treated as a global EA of the destination memory location. The AMM mover would then include the required logic to ascertain the correct destination node the logic for correctly packaging and addressing the data for transmittal via the network to the destination memory location. Notably, in one embodiment, a target of the AMM operation move may decline portions of the move based on resource constraints or other reasons.

H. Handling of Conflicts, Including Address Conflicts During AMM Operation

Figure 7:
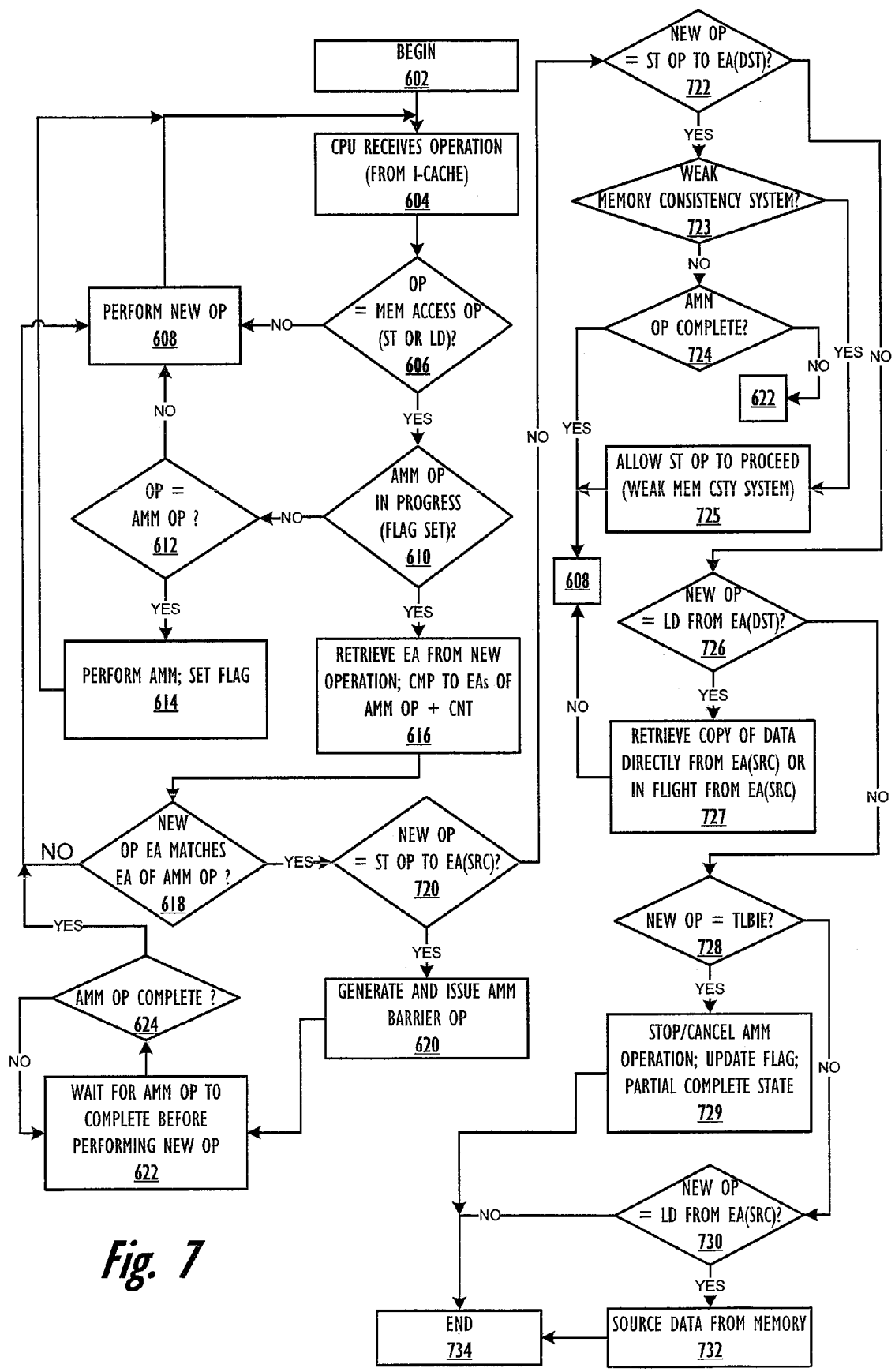
FIG. 7 is a flow chart illustrating another method by which the processor responds to possible address conflicts encountered during an AMM operation, in accordance with one embodiment.
Figure 9:
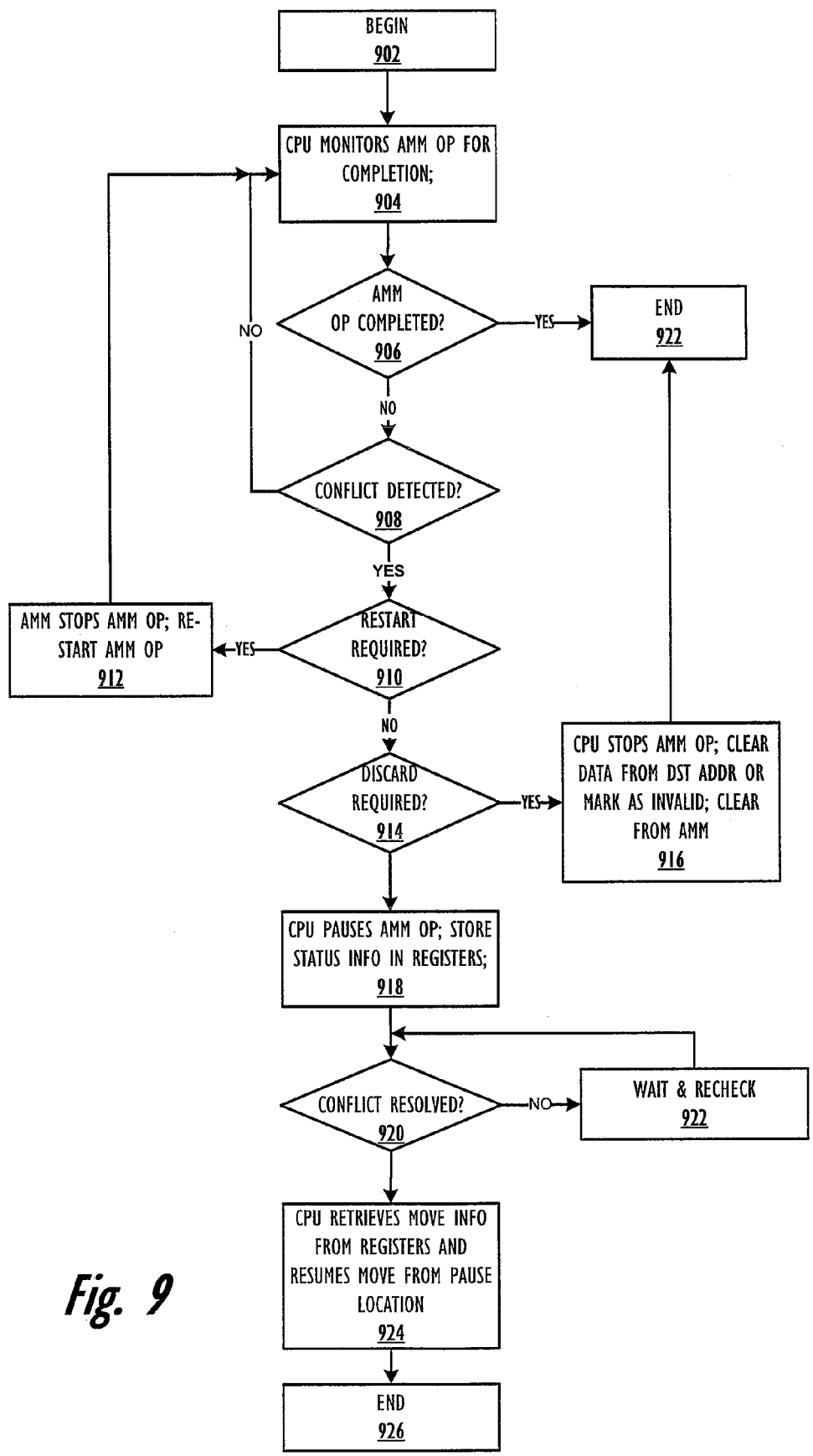
FIG. 9 is a flow chart illustrating the method by which the asynchronous memory mover suspends, halts, and resumes an AMM operation and provides support for a partially completed AMM operation, in accordance with described embodiments.

FIGS. 7 and 9 illustrate methods by which the CPU and/or AMM mover (working in conjunction with the memory controller) handles conflicts that are encountered when performing an AMM operation. The AMM includes logic for handling conflicts, including address conflicts such as requests to access/load the data that are being stored via the AMM operation.

In one embodiment, when dependencies exist for data of the AMM operation, the CPU (and the AMM mover) provides the data directly to the dependent operations from the source address. For example, the CPU gives data from the move to a load request if the load is for data at the same effective address (destination) to which the move occurs. In yet another embodiment, when the AMM operation has other operations dependent thereon, a destination address conflict results in the CPU placing the conflicting instruction in a wait queue pending completion of the memory move and subsequent dependent operations.

With reference now to FIG. 7A-7B, and in particular to block 720 which continues from block 618 (of FIG. 6). The blocks labeled in the 600s relate to FIG. 6 and have been previously described. When the newly received instruction matches those of an executing AMM operation, the CPU performs a series of additional checks. Beginning at block 720, the CPU determines if the newly received instruction performs a store to the source effective address from which the AMM operation initiates the move of the data. If the new instruction performs a store that overrides the data at the source effective address of the AMM operation, the process proceeds to block 620 at which the CPU (or AMM mover) generates and issues the AMM barrier operation.

However, when the new instruction is not a store to the source effective address of the AMM operation, the CPU determines at block 722 whether the new instruction performs a store operation that overwrites data at the destination effective address of the AMM operation. If the new instruction overwrites data at the destination effective address of the AMM operation, the CPU checks for an indication of the type of processing permitted by the processor, whether weak memory consistency model processing or strong memory consistency model processing. This determination is an internal check (i.e., not a coded process per se), since the CPU would be aware if the CPU was designed to permit weak memory consistency model processing and whether the current processor execution involves some mechanism (e.g., a bit flag) for setting the CPU to process instructions according to a strong memory consistency model. Specifically, as shown at decision block 723, the CPU checks whether the system is an out-of order system. This embodiment is premised on an assumption that the default processing scheme is strong memory consistency model processing.

When the system operates according to a weak memory consistency model, the CPU proceeds with executing the new ST operation, as shown at block 725. With weak memory consistency modeled systems, the ST operation may complete before the ongoing AMM operation so long as the ST operation targets a different destination address (i.e., does not write to the same destination effective address). When the ST operation writes to the same destination effective address, the CPU holds the ST operation until the AMM move of that data segment completes. Thus, the ST operation does not cause any dependency related stalls, and the ST operations proceed out of order relative to each other and the AMM operation as long as the ST operations do not target the same data segment (i.e., a store to the same effective address).

When the system does not operate according to a weak memory consistency model (i.e., the system is a strong memory consistency system), the process moves to block 724 at which the CPU checks whether the AMM operation has completed. When the AMM operation has completed, the process moves to block 608, at which the CPU performs the new ST operation. However, when the AMM operation has not completed, the new ST operation waits until the AMM operation completes before the ST operation itself completes (block 622). In one embodiment, where the AMM operation is broken into multiple smaller moves of segments of data, the ST operation only waits until the particular segment of data that is being stored to by the ST operation completes. Once the AMM mover completes the movement of the segment(s) targeted by the ST operation, the CPU allows the ST operation to proceed.

Returning to block 722, when the new operation is not a ST operation to the destination EA, the process moves to block 726 at which the CPU checks whether the new instruction loads data from the destination address. When the new instruction performs a load from the destination address, the CPU executes the new instruction, but the CPU may source the data directly from the source address, rather than wait for the data to be moved to the destination address, as shown at block 727. The CPU sources the data from the source address because the data at the source address remains the same data being moved to the destination address (i.e., the AMM only moves a copy of the data). Thus, the CPU may immediately execute the new instruction. Alternatively, the CPU retrieves a copy of the data while the data is in flight from the source address to the destination address.

Then, at block 728, the CPU determines whether the new operation is a TLB invalidate entry (TLBIE) operation. When the new operation is a TLBIE, the CPU signals the AMM mover to stop and cancel the AMM operation, as shown at block 729. In an alternate embodiment, the AMM mover completes the move of the data segment currently being moved, before accepting the TLBIE. This enables the data move to be in a partially done state, which state is indicated by the control bits in the AMM mover. When the new operation is not a TLBIE operation, the CPU determines, at block 730, whether the new instruction performs a load of the data from the source address. When the new instruction performs a load form the source address, the CPU executes the new instruction and sources the data from the source location in memory, as shown at block 732. Assuming the new operation is none of the above example (memory access) operations, the process ends at block 734.

I. AMM Operation Status Check & Responses

One embodiment also enhances the ISA to provide a mechanism (i.e., an instruction) for performing status checks on the completion status of an ongoing AMM operation. Specifically, the ISA provides a LD CMP instruction, which the processor executes to trigger a status check by the AMM mover of the completion of the AMM operation within the memory subsystem. Additionally, in one embodiment, the ISA provides a LD SPR (register) instruction, which the CPU executes to check a specific register that holds the status information for a particular AMM operation.

As described above and illustrated by FIG. 3, the AMM mover 220 includes a series of registers, including the status register 311 in which the AMM mover stores status information of the particular AMM operation. The AMM mover queries the memory controller for the status of the move, as the memory controller coordinates the data move. The memory controller provides the AMM mover with relevant status information, in response to the status query, which information the AMM mover places in the status register. In one embodiment, the AMM mover generates the status query on a periodic basis until the AMM operation completes. When the AMM operation completes, the AMM mover then resets the flag, which the AMM mover utilizes to alert the CPU of the completion.

Depending on the type of progress being made with the AMM operation, the memory controller may provide several different responses, such as, but are not limited to: (1) move in progress; (2) move stopped or terminated (i.e., mover no longer being performed); (3) move done/completed; (4) move partially done; and (5) software error on move.

The "move stopped or terminated" response may result from one or more of: (a) unaligned data, whereby the memory move may cross a page boundary, which function the system architecture does not support; (b) occurrence of a page fault; (c) SRC/DST address conflict; (d) no support provided by the memory controller for memory slides; and (e) no support provided by the memory controller for overlapping/concurrently performed moves, where the AMM mover requested a second move operation before a first move operation completes. Also, the AMM operation terminates or stops when the SMP does not have enough resources (free memory; bandwidth; AMM mover processing power) to complete the move. In one embodiment, the status response includes a signal to "retry AMM operation". The status response may also include information about the queue depth to alert the AMM mover of the amount of data remaining to be moved.

The CPU level query may be generated by the CPU executing a load instruction (LD CMP or LD SPR) to check on the completion status of the AMM operation. Thus, for example, the compiler provides a LD SPR instruction in the instruction stream following an AMM ST instruction. The CPU executes the LD SPR instruction, which instruction retrieves the content of the register (SPR) and returns the content to the CPU.

The content includes the current status of the AMM operation. In one embodiment, the CPU (or AMM mover) dynamically replaces an AMM operation with the standard sequence of LD and ST operations when the AMM receives a response indicating that the lower level architecture does not support memory moves via the AMM operation.

I.1 Partially Performed Memory Move—Partially Done State

In one embodiment, when the memory controller returns partially done state as the response, the response also includes the amount of bytes already moved and the EAs of the AMM operation (where multiple concurrent AMM operations are supported). When the AMM receives a response indicating a partially done status, along with the additional status information, the CPU (and/or AMM mover) may retrieve the status information, which provides the CPU (and/or AMM mover) with an indication of where the AMM operation was paused/stopped (i.e., the number of bytes moved and/or the EA at which the move stopped). The status information also provides an indication of why the AMM operation paused/stopped. Possible reasons for the partially done state include, but are not limited to: (1) the AMM operation ran out of resources, e.g., bandwidth, memory; (2) occurrence of a page crossing and/or page fault; (3) occurrence of an error condition, which prevents forward progress; and (4) encountering a TLBIE.

FIG. 9 illustrates an example method by which the CPU (and AMM mover) tracks completion of the AMM operation and controls execution of the AMM operation, based on detected conflicts and other potential issues. The process begins at block 902 and proceeds to block 904, which shows the CPU monitoring the AMM operation for a completion status. At block 906, the CPU determines whether such a completion notification was received, and if the completion is received, then the monitoring process for the particular memory move operation ends at termination block 922. However, when the AMM operation has not completed, the CPU (or AMM mover) determines at block 908 whether completing the AMM operation (or a subsequently received operation) causes a conflict. Assuming the CPU detects a conflict, the CPU may notify the AMM mover, based on the type of conflict and the response required to resolve the conflict.

At block 910, the CPU (or AMM mover) determines whether resolution of the conflict requires a stop and restart of the AMM operation. If the conflict requires a stop and restart of the AMM operation, the CPU triggers the AMM mover to stop the current AMM operation, restore the registers, and restart the AMM operation, as shown at block 912. However, if the conflict requires a stop and discard, as determined at block 914, the CPU triggers the AMM mover to stop the AMM operation, as shown at block 916. The AMM: mover (or CPU) may also clear the partially move data from the destination address or mark the data as invalid.

Assuming the conflict does not require a complete restart or discard of the AMM operation, the AMM mover pauses the AMM operation and stores the current status information for the AMM operation within the status register(s), as shown at block 918. Then, at block 920, the CPU (or AMM mover) determines whether the conflict was resolved. When the conflict is not resolved, the AMM waits until resolution of the conflict before resuming the AMM operation, as shown at block 922. However, once the CPU (or AMM mover) determines the conflict was resolved, the AMM mover retrieves the AMM operation's status information from the status register(s) and resumes moving the remaining data from the source location to the destination location (indicated as the location at which the pause occurred), as provided at block 924. Then, the process ends at block 926. Notably, as described above, the partially done state may also result from the receipt and processing by the CPU and memory mover of an AMM terminate instruction (420, 430).

J. Processor Architected and Memory-Mapped Registers for Communicating with an AMM Mover and Tracking the Status of an Asynchronous Memory Move Operation The CPU communicates with the AMM mover via one of two methods. In the first method, the compiler assigns several processor architected registers (i.e., registers similar to the GPRs and SPRs) to assist the CPU communicate relevant information (address parameters, control and status information) to the AMM mover. For example, the compiler may assign GPR14 and GPR22 (following from the above described sequence of load and store instructions that constitutes the example memory move operation). The embodiments in which processor architected registers are utilized includes those performed within server architectures.

In the second, alternate method, the compiler assigns specific locations in memory that are utilized by the CPU for communicating with the AMM mover. When the OS or compiler binds an application, the OS/compiler automatically allocates memory for performing the asynchronous move operation. These memory-mapped architected registers are identified to the AMM mover, which retrieves data from the registers to perform AMM operations. The use of memory mapped registers enables the CPU and AMM mover to perform AMM operations with no changes required to the processor architected registers.

When the CPU receives an AMM ST instruction 400, such as illustrated by FIG. 4A, the CPU retrieves the EAs, CNT, and control information from the AMM ST instruction, and the CPU forwards these parameters to the specific architected registers (whether the processor architected registers or memory mapped architected registers). For example, the processor passes EA1, EA2 and count values to respective architected registers, GPR1, GPR2, and GPR3. The AMM mover then utilizes the values found within the architected registers (GPR1, GPR2, GPR3) and performs the AMM operation. The memory controller receives the data from the GPRs and passes the addresses (EA1, EA2) to the TLB, which then generates a resulting real addresses (RA1, RA2) to perform the data move within the memory.

In one embodiment, the compiler defines the particular registers on a per-thread basis. Also, in one embodiment, described above, the compiler further allocates specific architected registers, similar to the GPRs and/or SPRS, to track the status of the AMM operation. Thus, one or more of the architected register in the processor core reports the status or result of an AMM operation to the CPU. The compiler may also allocate specific registers to allow the CPU to communicate a termination or interrupt request for the AMM operation. When (or if) the CPU executes a termination or an interrupt during processing of the AMM operation, the CPU (or AMM mover) restores the values of registers so that the registers appear as if the AMM operation never occurred. The CPU also communicates state information to the AMM mover via the architected registers for utilization when restoring the system from a failed or terminated AMM operation. The CPU adds the relevant state to each of the predefined registers, and the CPU utilizes the state for save and restore operations. In one embodiment, the compiler provides the architected states at the user level.

K. Specialized Asynchronous Memory Move Barrier Operations

In one embodiment, illustrated by FIGS. 4D and 4E, the compiler provides one or two types of AMM SYNC instruction (440, 450) which are supported by the ISA. In a first embodiment, the compiler inserts a SYNC command 431 into the control portion of an AMM ST instruction 400 (FIG. 4A) to generate the AMM SYNC instruction 440. With this configuration, AMM SYNC instruction 440 also includes TID 415, source EA 405, destination EA 407, count 409, as well as control/status information 411. In a second embodiment, a separate AMM SYNC instruction 450 includes SYNC command 431 and control bits 432. As introduced above and described herein, the separate AMM SYNC instruction 450 may be generated by the CPU 104 or AMM mover 220 based on detected address (or other conflicts) with a scheduled AMM operation and existing memory access operations, such as a previous AMM operation.

The instruction sequencer retrieves the AMM SYNC instruction 440, 450 from the instruction stream or the CPU generates the AMM SYNC command based on observed/potential conflicts. With the AMM SYNC instruction 440, when the processor begins execution of the associated AMM ST instruction with the SYNC command 431 in the control structure, the processor discovers the SYCN command in the control portion, and the processor responds by issuing the SYNC to the system fabric for completion before completing any further memory access operations. This halting of all operations includes AMM operation that will be generated from the current AMM ST instruction. The processor may proceed to complete the processor-level effective address move component of the AMM operation in virtual address space. The processor also forwards the SYNC command along with the other parameters to the AMM mover (via the architected registers).

On receipt of the SYNC command within the control register, the AMM mover withholds performing the AMM operation until notified by the processor of the receipt of the completion notification for the SYNC operation. The SYNC thus represents a request to "don't send data until done", unlike the regular system barrier operations, which do not affect the activation or completion of an AMM operation. In one embodiment, a special SYNC bit is provided within the AMM mover. The SYNC bit is set by the processor when the CPU executes an AMM SYNC command, whether as a separate instruction or a part of the control portion of the AMM ST instruction. When the bit is set, the AMM mover does not initiate completion of any further AMM operations, although those operations can be passed to the AMM mover via the architected registers.

L. Fully Asynchronous Memory Move in Presence of Barrier Operation

As introduced above, the modified ISA also provides support for a special barrier operation (or synchronization (SYNC) operation, which the ISA adds to the compiler. The standard sync operation, which halts further execution of new memory access operations (e.g., ST/write and LD/read operations) until the processor receives an acknowledgement of the completion of the SYNC, does not affect the execution of the AMM operation, because the AMM operation completes independent of the processor operations (i.e., with no direct processor oversight). When the processor issues/executes the special AMM SYNC instruction 440, 450, the AMM (or memory controller) responds by pausing/withholding the execution of the new AMM operations until the existing AMM operations as well as all other previously-issued memory access operations all complete their respective processes. In one embodiment, the AMM SYNC 440,450 stops/pauses the AMM operation by providing an interrupt to the CPU.

In one embodiment, the processor (or AMM mover) automatically generates and issues an AMM SYNC operation when/if the processor detects a pending AMM ST instruction 400 that requires access to data that has the same effective address as the destination effective address of a current AMM operation. Also, the AMM SYNC operation may be triggered when the AMM ST instruction 400 reads form a source address that is the target of a previously issued write operation or writes to a destination address whose data is being read by a previously-issued read operation.

On receipt of the register information along with the AMM SYNC 440, 450, the AMM mover stores the EAs, count and status information from the AMM ST instruction 400 within the assigned AMM registers and status bits. The AMM may then access the locations and status information at a later time (after the AMM SYNC completes) and continue or restart the AMM operation(s) that were preceded by the AMM SYNC 440, 450.

Figure 8:
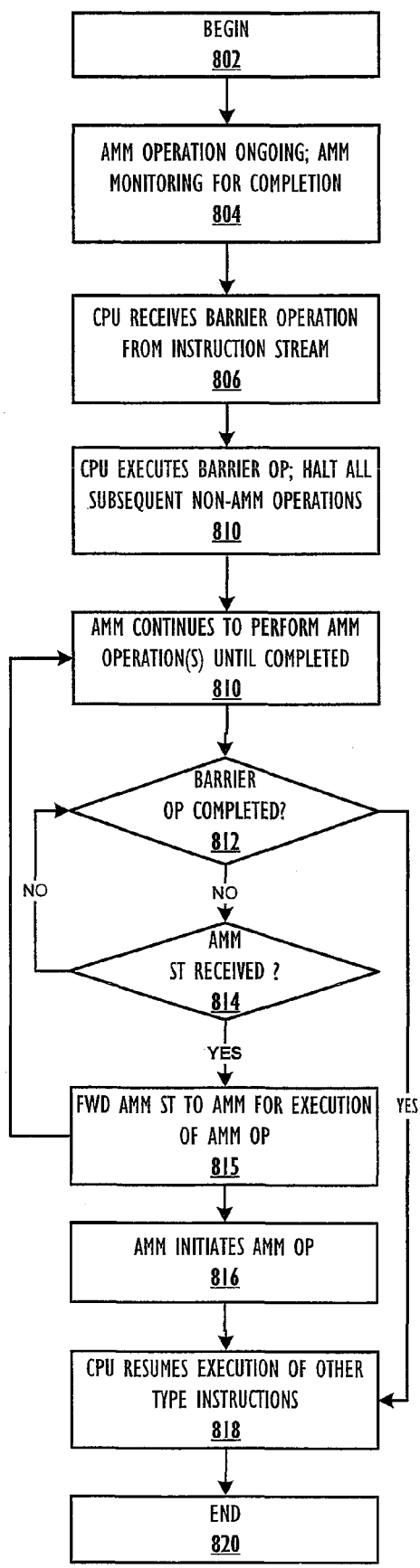
FIG. 8 is a flow chart illustrating the method by which the processor continues to execute an AMM operation during execution of a barrier operation that halts execution of the other non-AMM operations, according to one embodiment.

FIG. 8 illustrates the method by which the CPU (or AMM mover) responds to a regular SYNC instruction or barrier operation relative to the response to an AMM SYNC instruction 440, 450. Generally, the CPU does not halt or suspend an ongoing AMM operation when the CPU executes a regular SYNC instruction or barrier operation. The method begins at block 802 and proceeds to block 804 at which the AMM monitors for completion of an ongoing AMM operation. At block 806, the CPU receives a barrier operation (system SYNC) from the IFU. The CPU executes the barrier operation and halts execution of all subsequent instructions until the previously-issued memory access operations complete within the system (i.e., receipt of the notification of completion of the barrier operation), as shown at block 808.

However, as provided at block 810, while the system processes the barrier operation, the AMM mover continues to perform the AMM operation, in parallel, until the AMM operation completes. The CPU monitors for receipt of a completion notification for the barrier operation, at block 812. Then, if the CPU receives an AMM ST instruction before receiving the completion notification for the barrier operation, as determined at block 814, the CPU initiates processing of the AMM ST instruction 400 and forwards the relevant parameters to the architected registers to trigger the AMM mover to initiate completion of the AMM operation. The AMM initiates the AMM operation as provided at block 816, while the barrier operation is ongoing. When the CPU later receives the completion notification for the barrier operation, the CPU resumes execution of the other subsequently received instructions (post receipt of the barrier operation), as shown at block 818. The process then ends at block 820.

Thus, the system's completion of the barrier operation on the system fabric does not affect and is not affected by the initiation and/or completion of an AMM operation. The AMM mover continues processing the AMM operation even after execution of the barrier operation (or SYNC) because the CPU does not implement the memory move operation as a call-based I/O facility.

M. Cache Management of an Asynchronous Memory Move

The AMM ST instruction and execution thereof by the CPU and AMM mover complies with data dependency and memory consistency rules for normal LD and ST operations in a standard processor-cache-memory architecture.

Figure 10:
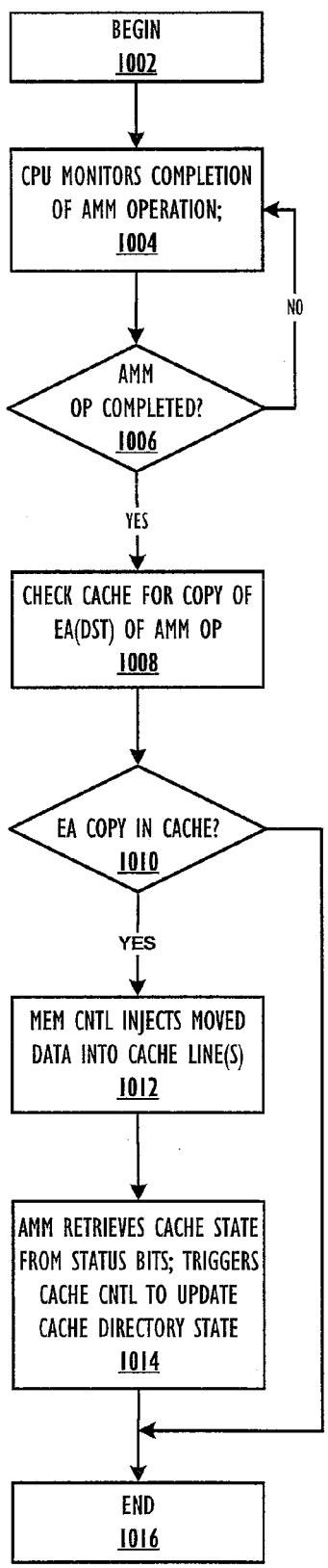
FIG. 10 is a flow chart illustrating the method of maintaining data cache coherency following an AMM operation via direct cache injection of data and cache state updates, according to one embodiment.

FIG. 10 illustrates the method by which the AMM mover performs cache management corresponding to data movement within the memory subsystem following or during an AMM operation. As described above, the status or control bits of the AMM ST instruction may include an indication of the coherency treatment to provide to the caches in the memory subsystem. Specifically, the AMM ST may include specific cache states that the AMM should assign to the moved data, when sourced from the destination address to the cache. Additionally, the AMM ST instruction may include information within the control/status bits indicating what to do with the source data and/or the destination data with respect to the copies of the data within the caches. In one embodiment, the status register bits may indicate one or more of the following, without limitation: (a) bring data to cache; (b) don't bring data to cache; (c) tag EA (SRC) data with one of E, S, or I states within the cache; and (d) tag EA (DST) data with one of M, E, or S states within the cache. In one implementation, the AMM provides data to the caches via cache injection.

Turning now to FIG. 10, which begins at block 1002, the CPU monitors the completion of the AMM operation, as shown at block 1004. CPU determines at decision block 1006 whether the AMM operation has completed. If the AMM operation has completed, the CPU checks the effective addresses of the caches against the destination effective address of the completed AMM operation, as shown at block 1008. At decision block 1010, CPU determines whether the destination effective address is within the caches. The presence of the destination effective address within the caches indicates that the memory block was previously cached, prior to the update of the destination effective address with the moved data. When the CPU determines that the destination EA is in the cache, the CPU notifies the AMM mover to inject the data from the destination effective address into the cache at the location within the cache tagged with the same effective address, as provided at block 1012. The AMM mover (or CPU) then retrieves the cache state from the status/control register bits and updates the cache state accordingly, as shown at block 1014. Then, the process ends at block 1016.

Figure 11:
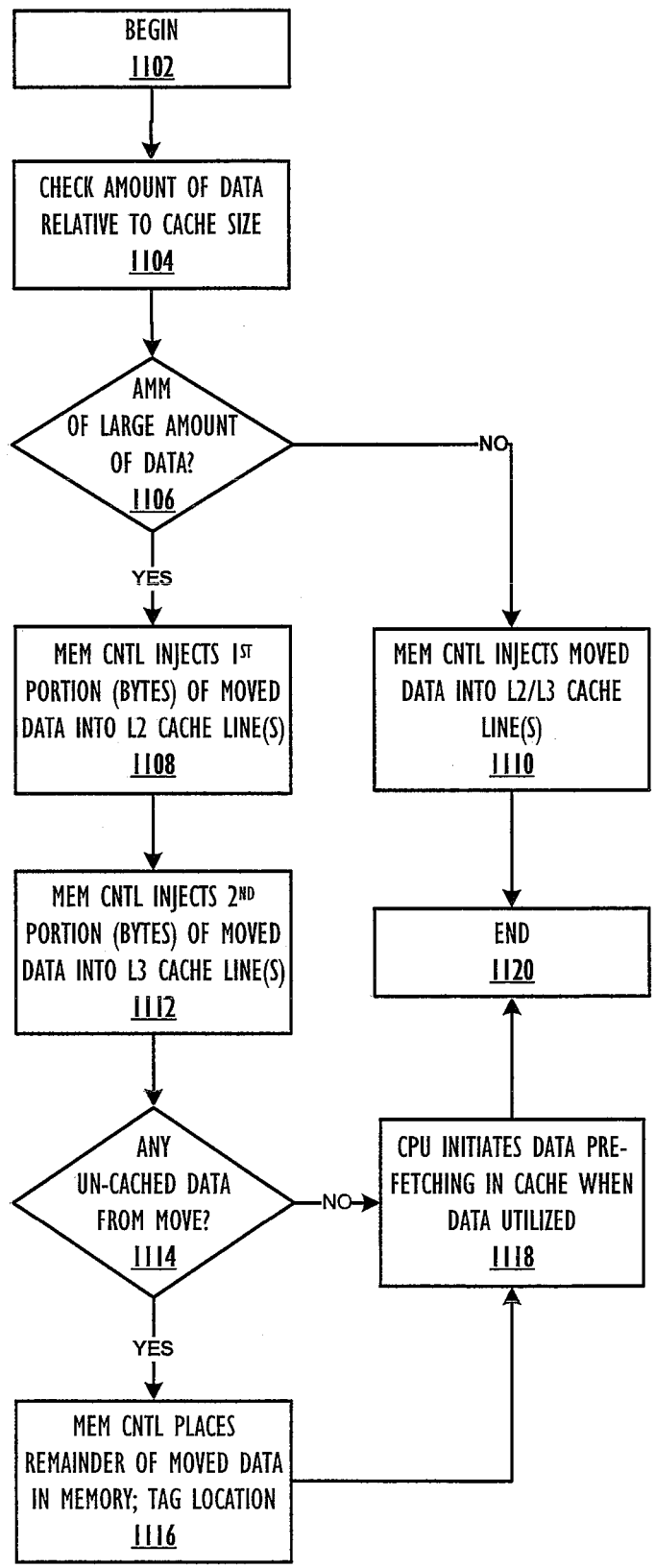
FIG. 11 is a flow chart illustrating the method of performing cache injection and subsequent data pre-fetching when the AMM operation involves movement of a large amount of data, according to one embodiment.

M.1 Structured Cache Injection for Asynchronous Memory Move of Large Amounts of Data In some instances, the AMM ST instruction executes a AMM operation that moves a large amount of data, i.e., larger than can be reasonably stored within the L2 and L3 caches. When this scenario presents itself, the AMM (operating through the memory controller) performs a structured cache injection to prevent overrun of the caches with an injection of data from a single AMM operation. That is, the memory controller executes cache injection of only a first portion of the total amount of data that the AMM operation moves to the destination address. Following the structured cache injection, the processor may access the total block of moved data via data pre-fetching, using the L2 and L3 caches to buffer sequential portions of the moved data from the larger amount of data stored at the memory. FIG. 11 illustrates the method by which the AMM mover implements the above process.

The process of FIG. 11 begins at block 1102 and proceeds to block 1104 at which the AMM mover checks the amount of data being moved by the AMM operation. At block 1106, the memory controller determines whether the amount of data is too large. The check may include a comparison of the CNT value to a threshold value, which may factor in the sizes of the L2 and/or L3 caches. If the amount of data is not large, the memory controller injects the moved data into the L2 and L3 cache, as shown at block 1110. However, when the amount of data is large, the memory controller selects a first portion (or subset) of the total data and injects that first portion into the L2 cache, as shown at block 1108.

In one embodiment, the first portion is a number, N, of bytes, which fits into the cache line size, such that an integer number of cache lines (less than the total number of cache lines in the L2 cache) are filled with data. At block 1112, the memory controller also injects a second, sequential portion of the moved data into the L3 cache, utilizing similar criteria for filling an integer number, M, of cache lines of the L3 cache, where M is less than the total number of L3 cache lines. Then, at block 1114, the memory controller checks whether there are remaining data that have not been injected into the caches. When there are additional data, the memory controller simply places that data within the memory (or indicates, with a tag, the start location of the remaining data that the memory controller did not injected into one of the caches), as shown at block 1116. Then, at block 1118, when the moved data is later requested and utilized by the CPU, the CPU has access to the first N lines of data in L2 and then M lines of data in L3 before the CPU needs to initiate data pre-fetching to bring the remaining data into the caches. The process then ends at block 1120.

M.2. Prefetching with Data being Moved by AMM Operation

The above implementation provides a method for enabling direct prefetching of requested from the destination effective address triggers a cache injection by the AMM mover (or memory controller) of relevant data from the stream of data being moved in the physical memory. The memory controller forwards the first prefetched line to the prefetch engine and L1 cache. The memory controller also forwards the next cache lines in the sequence of data to the L2 cache and a subsequent set of cache lines to the L3 cache. The memory controller then forwards the remaining data to the destination memory location. Quick access to prefetch data is enabled by buffering the stream of data in the upper caches rather than placing all the moved data within the memory. Also, the memory controller does not overrun the upper caches, by placing moved data into only a subset of the available cache lines of the upper level cache.

Figure 12:
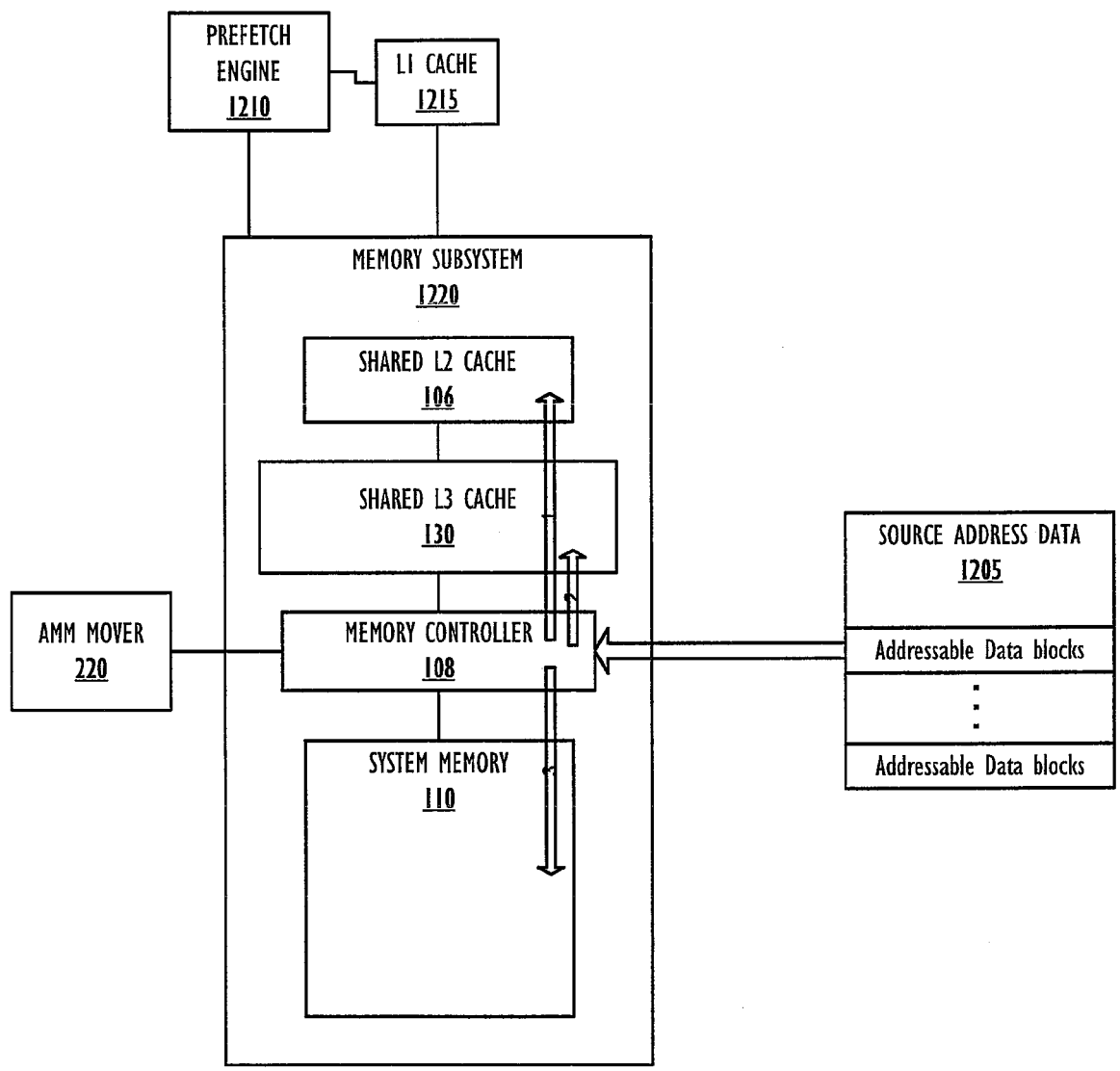
FIG. 12 is a block diagram representation of components involved in the performance of data prefetch from the data being moved by an AMM operation, according to one embodiment.

The above implementation enables proper placement of the data in the cache hierarchy for use during data prefetching. FIG. 12 illustrates an example memory subsystem 1220 coupled to an L1 cache and a prefetch engine 1210. Similar to FIGS. 1A-1C, memory subsystem 1220 comprises shared L2 cache 106, shared L3 cache 130 and system memory 110, access to which is controlled by memory controller 108. Memory controller 108 couples to AMM mover 220. During an AMM operation, AMM mover 220 causes example data 1205 to be moved (copied) from a source physical address to a destination physical address in system memory 110. Example data 1205 is assumed to comprise multiple blocks (cache line sized) of data, which are addressable via a sequence of consecutive effective addresses by the executing processor. While shown as originating from a source physical address outside of system memory 110, it is appreciated that example data 1205 may originate from a source address within system memory, and the present depiction is solely to illustrate the physical move of actual data.

Prefetch engine 1210 accesses memory subsystem 1220 to retrieve data before the data is actually requested by the executing processor (not shown). In the described embodiment, prefetch engine 1210 issues a prefetch request to memory subsystem 1220 for data being currently moved by an AMM operation. When the memory controller 108 (or AMM mover 220, which triggers the functions of the memory controller) detects the prefetch request during the AMM operation, and the request is for a first block of the example data 1205, the memory controller routes the first block of data to the L2 cache 106, as illustrated by numbered arrow 1. The memory controller 108 also routes the next sequential blocks of data in the L3 cache 130, as again illustrated by numbered arrow 2. The memory controller then places the remainder of the data in system memory 110, as indicated by arrow 3.

When no prefetch of the data is detected during the AMM move, the memory controller 108 may still inject the initial blocks of some of the moved data into the caches to avoid potential cache misses if the data is later requested. In either scenario, the memory controller limits the amount of data initially placed in the cache hierarchy. The memory controller does not place all the data in the cache hierarchy (L2-L3), to avoid polluting the caches. However, as the data starts being consumed by the processor core from the L2 cache 106, the next blocks of data moves from L3 cache 130 to L2 cache 130. Also, the remaining data placed in the memory, moves in address sequence from memory 110 to the L3 cache 130, such that a continuous flow of data from memory 110 to L3 cache 130 to L2 cache 106 is generated. Thus, when the data is being consumed, the processor does not encounter a cache miss as the data is streamed from the memory and caches for processor consumption. By limiting the amount of data placed in both the L2 cache 106 and the L3 cache 130 relative to the overall sizes of the respective caches, the memory controller reduces the likelihood of cache corruption with unused data, while reducing the likelihood of cache misses.

M3. Coherency Considerations

One important consideration when completing an AMM operation is that the data has to be sourced from the memory location or cache that contains the most coherent copy of the data. Thus, although the embodiments are described as sourcing data directly from memory, the actual application of the invention permits the data be sourced from any coherent location of the cache/memory subsystem.

Data that are the target of data move operation are sourced from the most coherent memory location from among actual memory, processor caches, lower level caches, intervening caches, etc. coherency states for each copy of the source data to determine the correct memory module within the memory subsystem that contains the coherent copy of the data being moved. A conventional coherency protocol (e.g., Modified (M), Exclusive (E), Shared (S), Invalid (I) or MESI protocol with regard to sourcing of coherent data may be employed; however, the coherency protocol utilized herein extends the conventional protocol to allow the AMM mover to obtain ownership of a cache line and complete the AMM operations.

The embodiments further enable movement of bytes, cache lines and pages of data. The relative time the AMM mover performs/receives a move may also be tracked by the AMM mover to enable proper sequencing of data exchange among AMM operations and maintenance of the correct coherency of the memory subsystem.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A data processing system comprising:
   a processor;
   a memory subsystem including a memory coupled to the processor and including a plurality of physical locations having real addresses for storing data;
   an asynchronous memory mover coupled to the processor and which, in response to receiving a set of parameters associated with a data move operation initiated by the processor utilizing a source effective address and a destination effective address, performs an asynchronous memory move (AMM) operation by which the actual data is moved from a first memory location having a source real address corresponding to the source effective address to a second memory location having a destination real address corresponding to the destination effective address;
   wherein the asynchronous memory mover further comprises a flag bit, which is set by the asynchronous memory mover logic when an AMM operation is ongoing at the memory; wherein the processor reads the flag bit before issuing a new memory access operation to determine possible address conflicts.

2. The data processing system of claim 1, wherein the asynchronous memory mover further comprises logic for evaluating and responding to address conflicts to prevent corruption of data during an AMM operation.

3. The data processing system of claim 2, wherein said logic for evaluating comprises:
  logic for detecting an address conflict between an AMM operation and a subsequent instruction received by the processor;
  in response to the subsequent instruction being a store instruction targeting the destination effective address and the processor provides strong memory consistency model processing:
    preventing execution of the store instruction until a completion of the AMM operation; and
    in response to the AMM operation completing in segments, enabling completion of the store operation when a move of data by the AMM operation to the segment of memory addresses targeted by the store operation completes, wherein the stored operation is permitted to complete prior to final completion of all segments of the AMM operation.

4. The data processing system of claim 3, wherein said asynchronous memory mover further comprises:
  logic for directly sourcing data requested by a subsequent instruction form the memory location corresponding to the source effective address when the subsequent instruction is received while an AMM operation is ongoing.

5. The data processing system of claim 2, wherein said logic for evaluating comprises:
  logic for detecting an address conflict between an AMM operation and a subsequent instruction received by the processor;
  in response to the subsequent instruction being a store instruction targeting the destination effective address and the processor provides weak memory consistency model processing:
    completing the store operation independent of the completion of the AMM operation, wherein the store operation and the AMM operation completes in parallel to the same destination memory address.

6. The data processing system of claim 2, wherein said logic for evaluating comprises:
  logic for detecting an address conflict between an AMM operation and a subsequent instruction received by the processor;
  in response to the subsequent instruction being a TLB invalidate entry (TLBIE) operation targeting the destination effective address:
    stopping the AMM operation and cancelling the AMM operation; and
    resetting the flag to indicate the data move is no longer in progress; and
    discarding the AMM operation from the asynchronous memory mover.

7. In a data processing system having a processor, a memory subsystem, and an asynchronous memory mover, a method comprising:
  in response to receiving a set of parameters associated with a data move operation initiated by the processor utilizing a source effective address and a destination effective address, performing an asynchronous memory move (AMM) operation by which the actual data is moved from a first memory location having a source real address corresponding to the source effective address to a second memory location having a destination real address corresponding to the destination effective address;
  setting a flag bit of the asynchronous memory mover to indicate that the asynchronous memory mover is currently performing an AMM operation at the memory;
  reading a value of the flag bit before issuing a new memory access operation to determine possible address conflicts; and
  evaluating and responding to address conflicts to prevent corruption of data during an AMM operation.

8. The method of claim 7, wherein said evaluating further comprises:
  detecting an address conflict between an AMM operation and a subsequent instruction received by the processor;
  in response to the subsequent instruction being a store instruction targeting the destination effective address and the processor provides strong memory consistency model processing:
  preventing execution of the store instruction until a completion of the AMM operation; and
  in response to the AMM operation completing in segments, enabling completion of the store operation when a move of data by the AMM operation to the segment of memory addresses targeted by the store operation completes, wherein the stored operation is permitted to complete prior to final completion of all segments of the AMM operation.

9. The method of claim 7, wherein said evaluating comprises:
  detecting an address conflict between an AMM operation and a subsequent instruction received by the processor;
  in response to the subsequent instruction being a store instruction targeting the destination effective address and the processor provides weak memory consistency model processing, completing the store operation independent of the completion of the AMM operation, wherein the store operation and the AMM operation completes in parallel to the same destination memory address.

10. The method of claim 7, wherein said evaluating comprises:
  detecting an address conflict between an AMM operation and a subsequent instruction received by the processor; and
  in response to the subsequent instruction is a TLB invalidate entry (TLBIE) operation targeting the destination effective address:
    stopping the AMM operation and cancelling the AMM operation; and
    resetting the flag to indicate the data move is no longer in progress; and
    discarding the AMM operation from the asynchronous memory mover.

11. The method of claim 7, further comprising:
  directly sourcing data requested by a subsequent instruction form the memory location corresponding to the source effective address when the subsequent instruction is received while an AMM operation is ongoing.

12. A computer program product comprising:
  a machine readable storage medium; and
  program code on the machine readable storage medium that when executed on a data processing system having a processor, a memory subsystem, and an asynchronous memory mover, the program code enables the functions of:
    in response to receiving a set of parameters associated with a data move operation initiated by the processor utilizing a source effective address and a destination effective address, performing an asynchronous memory move (AMM) operation by which the actual data is moved from a first memory location having a source real address corresponding to the source effective address to a second memory location having a destination real address corresponding to the destination effective address;

setting a flag bit of the asynchronous memory mover to indicate that the asynchronous memory mover is currently performing an AMM operation at the memory;

reading a value of the flag bit before issuing a new memory access operation to determine possible address conflicts; and evaluating and responding to address conflicts to prevent corruption of data during an AMM operation.

13. The computer program product of claim 12, wherein said program code for evaluating further comprises code for:

detecting an address conflict between an AMM operation and a subsequent instruction received by the processor;

in response to the subsequent instruction being a store instruction targeting the destination effective address and the processor provides strong memory consistency model processing:

preventing execution of the store instruction until a completion of the AMM operation; and in response to the AMM operation completing in segments, enabling completion of the store operation when a move of data by the AMM operation to the segment of memory addresses targeted by the store operation completes, wherein the stored operation is permitted to complete prior to final completion of all segments of the AMM operation.

14. The computer program product of claim 12, wherein said program code for evaluating further comprises code for:

detecting an address conflict between an AMM operation and a subsequent instruction received by the processor;

in response to the subsequent instruction being a store instruction targeting the destination effective address and the processor provides weak memory consistency model processing, completing the store operation independent of the completion of the AMM operation, wherein the store operation and the AMM operation completes in parallel to the same destination memory address.

15. The computer program product of claim 12, wherein said program code for evaluating further comprises code for:

detecting an address conflict between an AMM operation and a subsequent instruction received by the processor; and in response to the subsequent instruction being a TLB invalidate entry (TLBIE) operation targeting the destination effective address:

stopping the AMM operation and cancelling the AMM operation; and resetting the flag to indicate the data move is no longer in progress; and discarding the AMM operation from the asynchronous memory mover.

16. The computer program product of claim 12, wherein said program code further comprises code for directly sourcing data requested by a subsequent instruction form the memory location corresponding to the source effective address when the subsequent instruction is received while an AMM operation is ongoing.

* * * * *